(12) United States Patent
Leibig et al.

(10) Patent No.: US 11,724,458 B2
(45) Date of Patent: Aug. 15, 2023

(54) MANUFACTURE OF THREE DIMENSIONAL OBJECTS FROM THERMOSETS

(71) Applicant: CHROMATIC 3D MATERIALS, INC., Golden Valley, MN (US)

(72) Inventors: Cora Leibig, Maple Grove, MN (US); Daniel Gilbert, Maple Grove, MN (US)

(73) Assignee: Hochland SE, Heimenkirch (DE)

( * ) Notice: Subject to any disclaimer, the term of this patent is extended or adjusted under 35 U.S.C. 154(b) by 6 days.

(21) Appl. No.: 17/225,377

(22) Filed: Apr. 8, 2021

(65) Prior Publication Data

US 2021/0229360 A1 Jul. 29, 2021

Related U.S. Application Data

(60) Division of application No. 16/433,324, filed on Jun. 6, 2019, now Pat. No. 11,065,816, which is a (Continued)

(51) Int. Cl.
*B29C 64/336* (2017.01)
*B33Y 10/00* (2015.01)
(Continued)

(52) U.S. Cl.
CPC .......... *B29C 64/336* (2017.08); *B29C 64/106* (2017.08); *B29C 64/118* (2017.08); (Continued)

(58) Field of Classification Search
CPC ........ B29C 64/336; B33Y 10/00; B33Y 70/00
See application file for complete search history.

(56) References Cited

U.S. PATENT DOCUMENTS 3,657,036 A 4/1972 Mullenhoff et al.
5,114,989 A 5/1992 Elwell et al.
(Continued)

FOREIGN PATENT DOCUMENTS

CN 101160210 A 4/2008
CN 104924611 A 9/2015
(Continued)

OTHER PUBLICATIONS

Notification of the Second Office Action dated Apr. 7, 2021, by the Chinese Patent Office in corresponding Chinese Patent Application No. 201780075046.1, and an English Translation of the Office Action. (18 pages).
(Continued)

*Primary Examiner* — Zachary M Davis
(74) *Attorney, Agent, or Firm* — Lelkes IP; Robert Lelkes

(57) ABSTRACT

A method for creating a three dimensional (3D) object from reactive components that form a thermoset product. In one embodiment, a method includes providing first and second reactive components that are effective to form the thermoset product. In one embodiment, the thermoset product includes a urethane and/or urea-containing polymer. In one embodiment, the first reactive component includes an isocyanate and the second reactive component includes a polyol having at least one terminal hydroxyl group, a polyamine having at least one amine that includes an isocyanate reactive hydrogen, or a combination of the polyol and the polyamine. In one embodiment, the first reactive component includes a prepolymer, and optionally the ratio of viscosity of the first and second reactive components is from 1:3 to 3:1. Also provided is a 3D object that includes a completely reacted thermoset product, and a thermoset system that includes a first and a second reactive component.

20 Claims, 6 Drawing Sheets

Related U.S. Application Data continuation of application No. PCT/US2017/064941, filed on Dec. 6, 2017.

(60) Provisional application No. 62/524,214, filed on Jun. 23, 2017, provisional application No. 62/430,919, filed on Dec. 6, 2016.

(51) Int. Cl.

| | | |
|---|---|---|
| *B33Y 80/00* | (2015.01) | |
| *B29C 64/118* | (2017.01) | |
| *B29C 67/24* | (2006.01) | |
| *B29C 64/321* | (2017.01) | |
| *B29C 64/106* | (2017.01) | |
| *B29C 64/209* | (2017.01) | |
| *B29C 64/393* | (2017.01) | |
| *B33Y 70/10* | (2020.01) | |
| *B29K 75/00* | (2006.01) | |
| *B29K 105/00* | (2006.01) | |
| *B29K 105/04* | (2006.01) | |
| *B29K 101/10* | (2006.01) | |

(52) U.S. Cl.
CPC .......... *B29C 64/209* (2017.08); *B29C 64/321* (2017.08); *B29C 64/393* (2017.08); *B29C 67/246* (2013.01); *B33Y 10/00* (2014.12); *B33Y 70/10* (2020.01); *B33Y 80/00* (2014.12); *B29K 2075/00* (2013.01); *B29K 2101/10* (2013.01); *B29K 2105/0002* (2013.01); *B29K 2105/0094* (2013.01); *B29K 2105/04* (2013.01)

(56) References Cited

U.S. PATENT DOCUMENTS

| | | | |
|---|---|---|---|
| 6,454,972 | B1 | 9/2002 | Morissette et al. |
| 9,707,717 | B2 | 7/2017 | Sand |
| 9,914,274 | B2 | 3/2018 | Jones et al. |
| 2003/0004599 | A1 | 1/2003 | Herbak |
| 2008/0097067 | A1 | 4/2008 | Xie |
| 2015/0352787 | A1 | 12/2015 | Humbert et al. |
| 2016/0271872 | A1 | 9/2016 | Sand |
| 2016/0280976 | A1 | 9/2016 | Buser |
| 2017/0246802 | A1 | 8/2017 | Pyzik et al. |
| 2017/0355865 | A1 | 12/2017 | Fenn et al. |
| 2018/0326659 | A1* | 11/2018 | Gleyal-Martinez .... B33Y 10/00 |
| 2019/0283326 | A1 | 9/2019 | Leibig et al. |
| 2021/0016506 | A9 | 1/2021 | Leibig et al. |

FOREIGN PATENT DOCUMENTS

| | | |
|---|---|---|
| CN | 104974332 A | 10/2015 |
| CN | 105313332 A | 2/2016 |
| CN | 105636766 A | 6/2016 |
| CN | 106832833 A | 6/2017 |
| CN | 107400192 A | 11/2017 |
| CN | 108384501 A | 8/2018 |
| DE | 3607718 A1 | 9/1987 |
| DE | 19729982 A1 | 1/1999 |
| EP | 1876197 A2 | 1/2008 |
| EP | 2955004 A1 | 12/2015 |
| JP | 2004277498 A | 10/2004 |
| WO | 2006044305 A1 | 4/2006 |
| WO | 2008033224 A1 | 3/2008 |
| WO | 2011022205 A1 | 2/2011 |
| WO | 2011145446 A1 | 11/2011 |
| WO | 2014187982 A1 | 11/2014 |
| WO | 2014210099 A1 | 12/2014 |
| WO | 2015071074 A1 | 5/2015 |
| WO | 2016061060 A1 | 4/2016 |
| WO | 2016085914 A1 | 6/2016 |
| WO | 2016085992 A1 | 6/2016 |
| WO | 2016086216 A1 | 6/2016 |
| WO | 2016191329 A1 | 12/2016 |
| WO | 2017095658 A1 | 6/2017 |
| WO | 2019030267 A1 | 2/2019 |

OTHER PUBLICATIONS

International Search Report (PCT/ISA/210) dated Mar. 20, 2018, by the United States Patent Office as the International Searching Authority for International Application No. PCT/US2017/064941.
Notification of First Office Action dated Sep. 27, 2020, by the Chinese Patent Office in corresponding Chinese Patent Application No. 201780075046.1, and an English Translation of the Office Action. (17 pages).
Fink, Reactive Polymers Fundamentals and Applications, 2013, Elsevier, 2nd Edition, p. 59.
Pannone et al., "Kinetics of Isocyanate Amine Reactions", Journal of Applied Polymer Sciences, 1987, vol. 34, pp. 2409-2432.
Rios, Orlando et al., "Evaluation of Advanced Polymers for Additive Manufacturing", Oak Ridge National Laboratory, Materials Science and Technology Division Advanced Manufacturing Office, ORNL/TM-2017/509, CRADA Final REPORT/NFE-14-05252, 29 pages (Sep. 8, 2017).

* cited by examiner

MANUFACTURE OF THREE DIMENSIONAL OBJECTS FROM THERMOSETS

CROSS-REFERENCE TO RELATED APPLICATIONS

This application is a continuation of U.S. nonprovisional patent application Ser. No. 16/433,324 filed on Jun. 6, 2019, issued as U.S. Pat. No. 11,065,816 on Jul. 20, 2021, which is a continuation of international patent application no. PCT/US2017/064941 filed on Dec. 6, 2017, which claims the benefit of U.S. Provisional Application Ser. No. 62/430,919, filed Dec. 6, 2016, and U.S. Provisional Application Ser. No. 62/524,214, filed Jun. 23, 2017, each of which are incorporated by reference herein.

TECHNICAL FIELD OF THE INVENTION

This invention includes, but is not limited to, to formulations and methods for three dimensional printing using thermoset compositions such as, but not limited to, polyurethane.

BACKGROUND

Fused filament fabrication (FFF), also referred to in the art as thermoplastic extrusion, plastic jet printing (PJP), fused filament method (FFM), or fusion deposition modeling, is an additive manufacturing process wherein a material is extruded in successive layers onto a platform to form a 3-dimensional product. Typically, FFF uses a melted thermoplastic material that is extruded onto a lower-temperature platform. Three-dimensional printing ("3D printing") often uses support structures which are easily dissolved or removed from the part after it is finished. Disadvantages of existing FFF technology that uses thermoplastics include, but are not limited to, single material property printing, print-direction strength, limited durability, and limited softness. In contrast, thermosetting materials described herein have not been used in FFF because prior to cure the monomers are low viscosity liquids, and upon deposition the curing liquid flows or breaks into droplets, resulting in finished parts of low quality and undesirably low resolution. In practice, attempts to print with thermoset materials has required addition of fillers (such as inorganic powders or polymers) to induce thixotropic behavior in the resin before it is fully cured. These solutions affect the final properties of the printed part. Other problems include poor resolution control in the printed part and frequent clogging of mixing systems.

SUMMARY OF THE APPLICATION

The present disclosure provides a solution to one or more of the problems and/or disadvantages described above. The additive manufacturing process described herein can be referred to as extruded thermoset printing (ETP).

As used herein, the terms "thermoset," "thermoset product," and "thermoset material" are used interchangeably and refer to the reaction product of at least two chemicals which form a covalently bonded crosslinked or polymeric network. In contrast to thermoplastics, a thermoset product described herein may irreversibly solidify or set.

In certain embodiments, a solid polymer, (e.g., a polyurethane) described herein is an elastomer. An elastomer is a polymer (e.g., a polyurethane) that is deformable when stress is applied, but retains its original shape after the stress is removed.

As used herein, the term "layer" refers to a strand of thermoset product that has been extruded from an extrusion nozzle and deposited on, for instance, a substrate. A layer is initially a partially reacted thermoset product, and cures to become a completely reacted thermoset product.

As used herein, the term "partially reacted thermoset product" refers to a covalently bonded crosslinked or polymeric network that is still reactive, e.g., it still has hydroxyl, amine, and/or isocyanate functionality that gives a measureable hydroxyl number, NH number, or NCO number in a titration. In another embodiment, a partially reacted thermoset product is a thermoset product that has a viscosity below 3,000,000 cp. In one embodiment, a partially reacted thermoset product is a thermoset product that has a molecular weight of no greater than 100,000 g/mol. A completely reacted thermoset product is a covalently bonded crosslinked or polymeric network that has no measurable reactive groups (e.g., hydroxyl, amine, or isocyanate functionality). In another embodiment, a completely reacted thermoset product is one that is a solid and has no measurable viscosity.

Layer resolution is the profile, (e.g., height) for a layer. For instance, extruding a layer from a nozzle having a diameter of 1 millimeter (mm) results in a layer resolution that is 1 millimeter (e.g., 1 millimeter height). As used herein, the term "predetermined layer resolution" refers to the height of a layer and can be based on the height of the nozzle above the printing substrate and the size of the nozzle used to extrude the layer. A "predetermined layer resolution" includes a tolerance for spreading of a layer after the layer of thermoset product is extruded from a nozzle. Spreading of a layer after it is deposited on a substrate or another layer may, in some embodiments, result in a decrease of the height of the layer from the time it is deposited on the substrate. In one embodiment, a layer can spread so that the height of the layer decreases by no greater than 1%, no greater than 5%, no greater than 10%, no greater than 15%, no greater than 20%, no greater than 25%, no greater than 30%, no greater than 50%, or no greater than 75% of height of the layer when extruded. For instance, a layer having a height of 1 mm can spread so that the height of the layer decreases by no greater than 5%, resulting in layer that is 0.95 mm to 1 mm in height. The amount of spreading is determined when the thermoset of a layer is completely reacted. The predetermined layer resolution can be controlled by the height of the nozzle above the substrate, by the nozzle diameter, or a combination thereof. In one embodiment, the predetermined layer resolution is controlled by the smaller of the height of the nozzle above the substrate or the nozzle diameter. Suitable nozzles include but are not limited to those having an inner diameter at the tip of 0.01 to 2 mm, or having an equivalent cross-sectional area when a nozzle is used that is not round.

As used herein, the term "predetermined shape resolution" refers to the shape of a three dimensional object (3D object) made using a method described herein.

The inventor herein identified a problem which exists because the initial viscosities of commercially available thermoset starting materials after mixing are too low, and the commercially available thermoset starting materials are designed to allow the reaction mixture to flow and fill molds. However, this is the opposite of what is needed for ETP 3D printing. Provided herein is a process and system for generating a 3D object by forming successive layers of curing thermoset material, each successive layer forming covalent bonds with, and adhering to, the previously deposited layer, to define the desired 3D object having a predetermined shape resolution. Many types of object forms can be created with the techniques described herein. Complex forms are more easily created by using the functions of a computer to help generate the programmed commands and to then send the program signals to the object forming subsystem. Open-source software packages for converting 3-dimensional objects from CAD files into "slicer" STL files for defining the layers of the object and software to control the printer are available to the skilled person and routinely used. Geometries of such complex forms are available which cannot be easily configured with molds. In one embodiment, the covalent bonds between layers consists of bonds formed between the partially reacted thermoset product, e.g., an adhesive is not added during the method and an adhesive does not exist between layers deposited during the creation of the object. In one embodiment, a complex geometry can built in a single process step without first building multiple parts which must be assembled and joined together. In another embodiment, a part with regions of differing material properties can be built in a single process without first building multiple parts from varied materials and then assembled and joined together.

In one broad aspect, this disclosure provides a method of creating a three dimensional object from reactive components that form thermoset products using ETP, comprising: providing first and second reactive components which have molecular weights and viscosities that are effective to form a given part resolution, e.g., a predetermined layer resolution, during the method; introducing the first and second reactive components into a mixing chamber where mixing occurs and wherein the first and second reactive components have a residence time in the mixing chamber and/or extrusion nozzle effective to meet the desired predetermined layer resolution, wherein the first and second reactive components have a residence time in the mixing chamber insufficient to completely react, so that the mixture of the first and second reactive components forms a partially formed thermoset composition, e.g., a partially reacted thermoset product, in the mixing chamber; extruding the partially reacted thermoset product out of the mixing chamber through an extrusion nozzle and onto a substrate, such as a stage or a layer of previously formed and partially reacted thermoset product; and moving the extrusion nozzle and/or the substrate (relative to each other) to sequentially deposit layers of partially reacted thermoset product to form a 3D object having a predetermined shape resolution. In one embodiment, a partially reacted thermoset product is extruded out of the mixing chamber through an extrusion nozzle and onto a layer of previously formed and completely reacted thermoset product.

In one broad aspect, this disclosure provides a method of creating a 3D object from reactive components that form thermoset products using ETP, including: providing first and second reactive components that are effective to form a thermoset product having a predetermined layer resolution during the method; introducing the first and second reactive components into a mixing chamber where mixing occurs to form a mixture, wherein the first and second reactive components have a residence time in a mixing chamber effective to form a partially reacted thermoset product in the mixing chamber and result in the predetermined layer resolution upon exiting the mixing chamber, wherein the first and second reactive components have a residence time in the mixing chamber insufficient to completely react; extruding the partially reacted thermoset product out of the mixing chamber through an extrusion nozzle and onto a substrate, such as a stage or a layer of previously formed thermoset; and moving the extrusion nozzle and/or the substrate to form a 3D object having a predetermined shape resolution, wherein the layers of thermoset are deposited sequentially by moving the extrusion nozzle and/or the substrate to form a desired three dimensional object. In another broad respect, this disclosure provides an apparatus for creating a three dimensional object from reactive components that form a thermoset product, comprising: an automatically moveable extrusion nozzle; first and second containers adapted for holding first and second reactive components; and a stage for receiving a partially reacted thermoset product resulting from the mixing of the first and second components. In one embodiment, the first and second components have molecular weights and viscosities that are effective to form a layer having a predetermined layer resolution for the three dimensional object. In another embodiment, the first and second reactive components are effective to form a thermoset product having a predetermined layer resolution as it is extruded through an extrusion nozzle. Optionally, additional containers of reactive components may be incorporated in order to provide a wider range of final polymers; additional containers might also contain catalysts, water, or other reactants which can be varied. Optionally, an apparatus also permits control of the amounts of the first and second reactive components that are combined to form a thermoset product having a predetermined layer resolution. An apparatus useful herein also includes the ability to maintain a precise metering of the reactant components so that a ratio of the first and second reactive components, or additional reactive components (e.g., a third reactive component), are mixed. Altering the amounts of additional components, e.g., a third, fourth, or fifth component, during production of a 3D object can result in a 3D object having one or more properties vary between different areas of the 3D object. For instance, the hardness, density, durability, or a combination thereof, can change between two different areas of the 3D object.

In this disclosure, a thermoset product is made from reactive components that have viscosities and components having molecular weights such that they can be used to make a 3D object with the required object resolution. In another embodiment, the thermoset product is made from reactive components that are effective to form the thermoset product having a predetermined layer resolution upon extrusion from an extrusion nozzle.

In the practice of this disclosure, a mixing chamber is used with a configuration such that the two or more reactive components are intimately mixed, and with a residence time and optional catalyst level such that the reaction is extended far enough at the time of extrusion from an extrusion nozzle that the material can maintain the required resolution (e.g., the predetermined layer resolution). The reactive components can also be selected to facilitate mixing with minimal agitation (such as, but not limited to, use of static mixers) where the reactive components have similar characteristics, such as similar viscosities, similar chemical compatibility, or a combination thereof.

In one embodiment, the two reactive components are designed to include fast reactants and corresponding catalysts so that upon mixing the resulting thermoset product quickly exceeds required characteristics (e.g., viscosity) for predetermined layer resolution, but also designed to include slow reactants (e.g., in one embodiment, some slower reacting isocyanate and/or polyol functionalities) and corresponding catalysts so that the mixture is not completely reacted (i.e., it is a partially reacted thermoset product, not a completely reacted thermoset) at the time that the next layer is applied, thus bringing strong adhesion between layers. In other embodiments, the two reactive components are designed to include fast reactants and corresponding catalysts, or slow reactants and corresponding catalysts. "Fast" reactants refers to reactive components that react quickly enough to increase viscosity immediately (e.g., within 1 second after mixing) and form a partially reacted thermoset product that maintains its layer resolution after deposition on a substrate or a previously deposited layer of thermoset product. "Slow" reactants refers to reactive components that can begin to react after it is deposited and result in the final completely reacted thermoset product. The relative reaction speeds of various reactive components that produce polymers (e.g., polyurethanes) are known to the skilled person. For instance, aliphatic isocyanates are typically slower than aromatic isocyanates, methylene diphenyl di-isocyanates (MDI) are generally faster than toluene di-isocyanates (TDI), and one isocyanate on isophorone diisocyanate (IPDI) is much slower than the other. Fast reacting components include chain extenders, including but not limited to di-amine, water, and compounds that include a primary hydroxyl reaction group.

Fast and slow reactants can be in the same reactive component or in different reactive components. When both fast and slow reactants are in the same reactive component, the reactive component can be one that includes an isocyanate or one that includes a polyol. In one embodiment, the reactive component containing a polyol contains a fast reactant, a slow reactant, and a polyol and/or polyamine prepolymer, and that other reactive component includes at least one type of monomeric isocyanate and an isocyanate prepolymer. In one embodiment, one or more fast reactants can make up from 1% to 20% (wt %) of a reactive component. In one embodiment, one or more slow reactants can make up from 50% to 99% (wt %) of a reactive component.

In one embodiment, temperature can also be used to alter characteristics (e.g., viscosity) of the partially reacted thermoset product as it exits the extrusion nozzle, or to speed the reaction upon contacting the substrate or a previously deposited layer of thermoset product. The operating temperature of the printing environment, e.g., the reactants, the mixing chamber, the nozzle, the substrate, and/or the air of the chamber in which an object is created, can be from 0° C. to 150° C. The skilled person will recognize suitable operating temperatures can vary depending upon the thermoset. For instance, some polyester polyols are solid at room temperature, thus higher operating temperatures can be useful when creating an object with a polyester polyol.

In the practice of this disclosure, a composition can be employed wherein the segment lengths can be systematically altered to provide a change in mechanical properties (e.g., from flexible to hard, from solid to foam, or a combination thereof) during the deposition. As used herein, "segment length" refers to the smallest molecular weights between the linkage points (urethane, urea, etc.). For instance, use of a specific polyol results in a segment length based on the presence of that polyol in the polymer.

In one embodiment of this disclosure, a foam is 3D printed by co-extruding first and second reactive components effective to form a thermoset product and produce a gas when they come into contact. For example, a reactive component can be used which contains isocyanates with a second reactive component containing a blowing agent. A blowing agent is a compound that is capable of producing a cellular structure in a partially reacted thermoset product. Examples of blowing agents include chemical blowing agents, such as water, and physical blowing agents, such as Freon and other chlorofluorocarbons, hydrochlorofluorocarbons, and alkanes.

The term "and/or" means one or all of the listed elements or a combination of any two or more of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The terms "comprises" and variations thereof do not have a limiting meaning where these terms appear in the description and claims.

It is understood that wherever embodiments are described herein with the language "include," "includes," or "including," and the like, otherwise analogous embodiments described in terms of "consisting of" and/or "consisting essentially of" are also provided.

Unless otherwise specified, "a," "an," "the," and "at least one" are used interchangeably and mean one or more than one.

Also herein, the recitations of numerical ranges by endpoints include all numbers subsumed within that range (e.g., 1 to 5 includes 1, 1.5, 2, 2.75, 3, 3.80, 4, 5, etc.).

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

DETAILED DESCRIPTION OF ILLUSTRATIVE EMBODIMENTS

Figure 1:
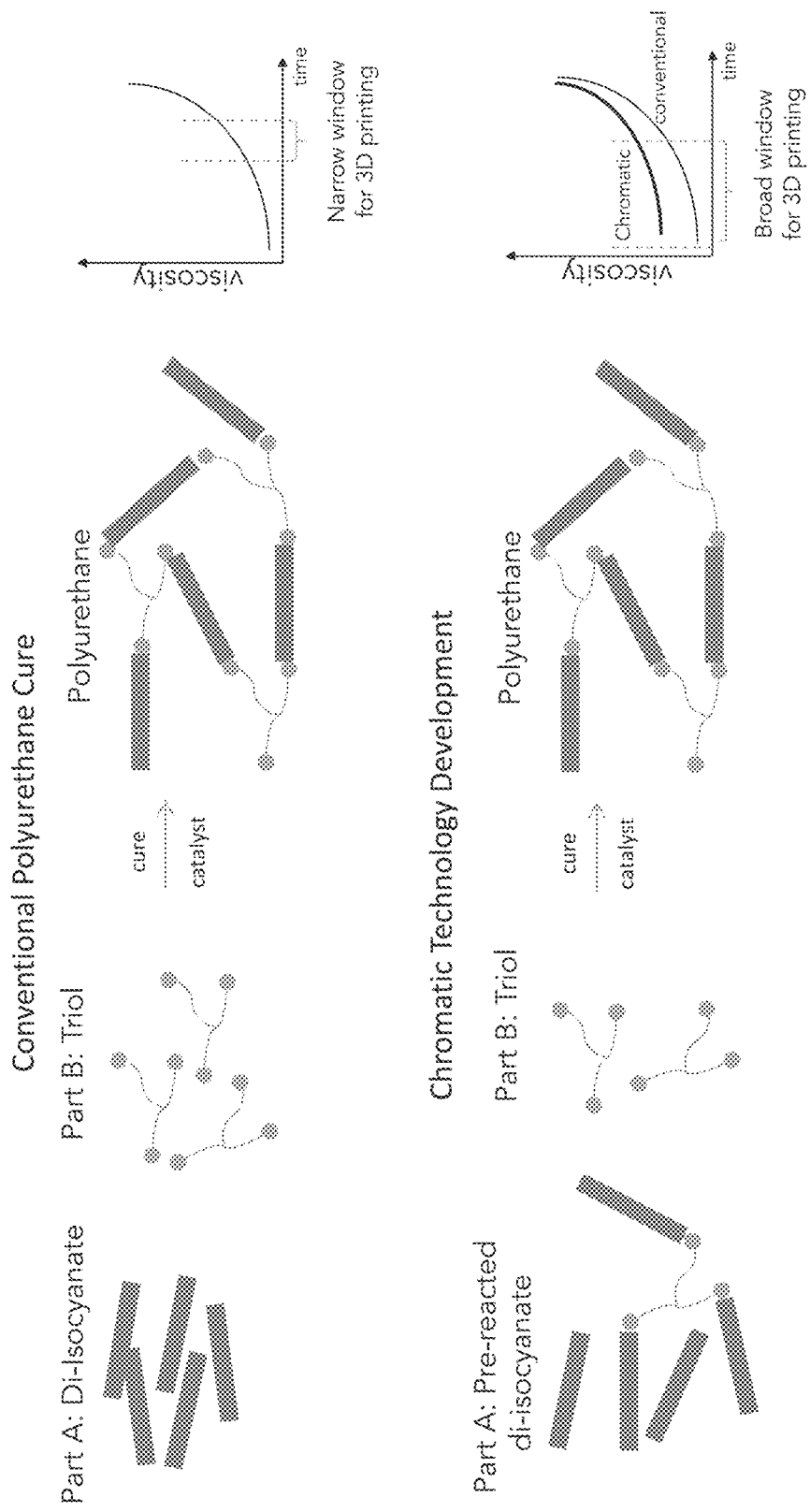
FIG. 1 shows a schematic of a polymer chemistry approach for developing 3D printable polyurethane precursors for production of non-foams. With conventional polyurethane foam precursor formulas, the initial viscosity is too low to print. As described herein, reaction components can be pre-reacted to form a high viscosity, printable formula and create a broad processing window for printing.

The present disclosure provides methods that use the principles of computer generated graphics to simultaneously execute CAD and CAM, and to produce 3D objects directly from computer instructions. Such methods can be used to sculpture models and prototypes in a design phase of product development, or as a manufacturing tool, or even to produce art forms.

In the extruded thermoset printing (ETP) method of the present disclosure the generation of individual solid or foam laminae (also referred to herein as layers) representing cross-sections of a 3D object is accomplished. The successively formed adjacent layers form the desired 3D object which has been programmed into the system. Hence, the system of the present disclosure generates 3D objects by extruding material in a pattern according to a cross-sectional pattern of the object to be formed at a selected surface of a reactive thermoset composition, e.g., a surface of a partially reacted thermoset product. Successive adjacent layers, representing corresponding successive adjacent cross-sections of the object, are automatically formed and integrated together (e.g., crosslinked by covalent bonds) to provide a step-wise laminar or thin layer buildup of the object, whereby a 3D object is formed and drawn from successively deposited substantially planar or sheet-like surfaces of the fluid medium during the forming process, where the 3D object has a predetermined shape resolution.

The process employs a fluid reactive composition including, but not limited to, first and second reactive components. The reactive composition is capable of forming thermoset compositions such as polyurethanes.

As used herein, a "reactive component" refers to a composition that includes at least one chemical that can react with another chemical to result in a thermoset product. In one embodiment, a reaction described herein includes mixing a first reactive component with a second reactive component to result in a thermoset product. A "reactive component" can also, and typically does, include one or more components that do not react to result a thermoset product. Thus, it is understood that not all "reactive components" are reactive per se. Non-limiting examples of components that do not react to result a thermoset product include certain additives (e.g., certain catalysts), a solvent, and the like.

In one embodiment, the thermoset is a urethane and/or urea-containing polymer. In one embodiment, as used herein a "urethane and/or urea-containing polymer" is a polymer which contains urethane groups (—NH—(C=O)—O—) as part of the polymer chain. In general, a urethane linkage is formed by reacting isocyanate groups (—N=C=O) with hydroxyl groups (—OH). A polyurethane is produced by the reaction of an isocyanate containing at least two isocyanate groups per molecule with a compound having terminal hydroxyl groups. In one embodiment, an isocyanate having, on average, two isocyanate groups per molecule is reacted with a compound having, on average, at least two terminal hydroxyl groups per molecule.

In one embodiment, as used herein a "urethane and/or urea-containing polymer" is a polymer which contains urea groups (—NH—(C=O)—NH—) as part of the polymer chain. In general, a urea linkage is formed by reacting isocyanate groups (—N=C=O) with amine groups (e.g., —N(R')$_2$), where each R' is independently hydrogen or an aliphatic and/or cyclic group (typically a (C1-C4)alkyl group)). A polyurea is produced by the reaction of an isocyanate containing at least two isocyanate groups per molecule with a compound having terminal amine groups.

As used herein, "aliphatic group" refers to a saturated or unsaturated linear or branched hydrocarbon group. This term is used to encompass alkyl (e.g., —CH$_3$) (or alkylene if within a chain such as —CH$_2$—), alkenyl (or alkenylene if within a chain), and alkynyl (or alkynylene if within a chain) groups, for example. As used herein, "alkyl group" refers to a saturated linear or branched hydrocarbon group including, for example, methyl, ethyl, isopropyl, t-butyl, heptyl, dodecyl, octadecyl, amyl, 2-ethylhexyl, and the like. As used herein, "alkenyl group" refers to an unsaturated, linear or branched hydrocarbon group with one or more carbon-carbon double bonds, such as a vinyl group. As used herein, "alkynyl group" refers to an unsaturated, linear or branched hydrocarbon group with one or more carbon-carbon triple bonds. Unless otherwise indicated, an aliphatic group typically contains from 1 to 30 carbon atoms. In some embodiments, the aliphatic group contains 1 to 20 carbon atoms, 1 to 10 carbon atoms, 1 to 6 carbon atoms, 1 to 4 carbon atoms, or 1 to 3 carbon atoms.

As used herein, "cyclic group" refers to a closed ring hydrocarbon group that is classified as an alicyclic group, aromatic group, or heterocyclic group, and can optionally include an aliphatic group. As used herein, "alicyclic group" refers to a cyclic hydrocarbon group having properties resembling those of aliphatic groups. As used herein, "aromatic group" or "aryl group" refers to a mono- or polynuclear aromatic hydrocarbon group. As used herein, "heterocyclic group" refers to a closed ring hydrocarbon in which one or more of the atoms in the ring is an element other than carbon (e.g., nitrogen, oxygen, sulfur, etc.). Unless otherwise specified, a cyclic group often have 6 to 20 carbon atoms, 6 to 18 carbon atoms, 6 to 16 carbon atoms, 6 to 12 carbon atoms, or 6 to 10 carbon atoms.

In one embodiment, as used herein a "urethane and/or urea-containing polymer" is a polymer which contains both urethane and urea groups as part of the polymer chain. A polyurethane/polyurea is produced by the reaction of an isocyanate containing at least two isocyanate groups per molecule with a compound having terminal hydroxyl groups and a compound having terminal amine groups. In one embodiment, a polyurethane/polyurea is produced by the reaction of an isocyanate containing at least two isocyanate groups per molecule with a compound having terminal hydroxyl groups and terminal amine groups (e.g., a hydroxyl-amine such as 3-hydroxy-n-butylamine (CAS 114963-62-1)). Optionally and preferably, a reaction to make a polyurethane, a polyurea, or a polyurethane/polyurea includes other additives, including but not limited to, a catalyst, a chain extender, a curing agent, a surfactant, a pigment, or a combination thereof.

An isocyanate, which is typically considered a polyisocyanate, has the structure R—(N=C=O)$_n$, where n is at least 2, at least 3, at least 4, at least 5, at least 6, at least 7, or at least 8, and where R is an aliphatic and/or cyclic group. In one embodiment, an isocyanate has an n that is equivalent to n in Methylene diphenyl diisocyanate (MDI). In one embodiment, the isocyanate is a di-isocyanate (R—(N=C=O)$_2$ or (O=C=N)—R—(N=C=O)).

Examples of isocyanates include, but are not limited to, methylene diphenyl diisocyanate (MDI) and toluene diisocyanate (TDI). Examples of MDI include, but are not limited to, monomeric MDI, polymeric MDI, and isomers thereof. Examples of isomers of MDI having the chemical formula $C_{15}H_{10}N_2O_2$ include, but are not limited to, 2,2'-MDI, 2,4'-MDI, and 4,4'-MDI. Examples of isomers of TDI having the chemical formula $C_9H_6N_2O_2$ include, but are not limited to, 2,4-TDI and 2,6-TDI. Other examples of isocyanates include, but are not limited to, monomeric diisocyanates and blocked polyisocyanates. Examples of monomeric diisocyanates include, but are not limited to, hexamethylene diisocyanate (HDI), methylene dicyclohexyl diisocyanate or hydrogenated MDI (HMDI), and isophorone diisocyanate (IPDI). One example of a HDI is hexamethylene-1,6-diisocyanate. One example of a HMDI is dicyclohexylmethane-4,4'diisocyanate. Blocked polyisocyanates are typically based on HDI or IDPI. Examples of blocked polyisocyanates include, but are not limited to, HDI trimer, HDI biuret, HDI uretidione, and IPDI trimer.

Other examples of isocyanates that can be used for producing a thermoset described herein include, but are not limited to, aromatic diisocyanates, such as a mixture of 2,4- and 2,6-tolylene diisocyanates (TDI), diphenylmethane-4,4'-diisocyanate (MDI), naphthalene-1,5-diisocyanate (NDI), 3,3'-dimethyl-4,4'-biphenyl diisocyanate (TODI), crude TDI, polymethylenepolyphenyl isocyanurate, crude MDI, xylylene diisocyanate (XDI) and phenylene diisocyanate; aliphatic diisocyanates, such as 4,4'-methylene-biscyclohexyl diisocyanate (hydrogenated MDI), hexamethylene diisocyanate (HMDI), isophorone diisocyanate (IPDI) and cyclohexane diisocyanate (hydrogenated XDI); and modified products thereof, such as isocyanurates, carbodiimides and allophanamides.

A compound having terminal hydroxyl groups (R—(OH)$_n$), where n is at least 2 (referred to herein as "di-functional"), at least 3 (referred to herein as "tri-functional"), at least 4, at least 5, at least 6, at least 7, at least 8, at least 9, and no greater than 10, where R is an aliphatic and/or cyclic group, is referred to herein as a "polyol." The skilled person will recognize that a polyol mixture will often include a small amount of mono-functional compounds having a single terminal hydroxyl group.

Examples of polyols include, but are not limited to, polyester polyols and polyether polyols. Examples of polyester polyols include, but are not limited to, those built from condensation of acids and alcohols. Specific examples include those built from phthalic anhydride and di-ethylene glyol, phthalic anhydride and di-propylene glycol, adipic acid and butane diol, or succinic acid and butane or hexane diol. The skilled person will recognize that many polyester polyols are semi-crystalline. Examples of polyether polyols include, but are not limited to, those built from polymerization of an oxide such as ethylene oxide, propylene oxide, or butylene oxide from an initiator such as glycerol, di-propylene glycol, TPG (tripropylene glycol), castor oil, sucrose, or sorbitol.

Other examples of polyols include, but are not limited to, polycarbonate polyols and lactone polyols such as polycaprolactone. In one embodiment, a compound having terminal hydroxyl groups (R—(OH)$_n$) has a molecular weight (calculated before incorporation of the compound having terminal hydroxyl groups into a polymer) of from 200 Daltons to 20,000 Daltons, such as from 200 Daltons to 10,000 Daltons.

A compound having terminal amine groups (e.g., R—(N(R')$_2$)$_n$), where n is at least 2, at least 3, at least 4, at least 5, at least 6, at least 7, at least 8, at least 9, and no greater than 10, where R is an aliphatic and/or cyclic group, and where each R' is independently hydrogen or an aliphatic and/or cyclic group (typically a (C1-C4)alkyl group), is referred to herein as a "polyamine." The skilled person will recognize that a polyamine mixture will often include a small amount of mono-functional compounds having a single terminal amine group.

A suitable polyamine can be a diamine or triamine, and is preferably either a primary or secondary amine. In one embodiment, a compound having terminal amine groups has a molecular weight (calculated before incorporation of the compound having terminal hydroxyl groups into a polymer) of from 30 Daltons to 5000 Daltons, such as from 40 Daltons to 400 Daltons.

Examples of polyamines include, but are not limited to, diethyltoluene diamine, di-(methylthio)toluene diamine, 4,4'-methylenebis(2-chloroaniline), and chain extenders available under the trade names LONZACURE L15, LONZACURE M-CDEA, LONZACURE M-DEA, LONZACURE M-DIPA, LONZACURE M-MIPA, and LONZACURE DETDA.

Other examples of suitable polyamines include, but are not limited to, ethylene diamine, 1,2-diaminopropane, 1,4-diaminobutane, 1,3-diaminopentane, 1,6-diaminohexane, 2,5-diamino-2,5-dimethlhexane, 2,2,4- and/or 2,4,4-trimethyl-1,6-diaminohexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4' and/or 4,4'-diaminodicyclohexyl methane, and 3,3'-dialkyl-4,4'-diamino-dicyclohexyl methanes such as 3,3'-dimethyl-4,4-diamino-dicyclohexyl methane and 3,3'-diethyl-4,4'-diaminodicyclohexyl methane; aromatic polyamines such as 2,4- and/or 2,6-diaminotoluene and 2,6-diaminotoluene and 2,4' and/or 4,4'-diaminodiphenyl methane; and polyoxyalkylene polyamines.

Unless stated otherwise, the term "polyol and/or polyamine mixture" refers to a mixture of one or more polyols of varied molecular weights and functionalities, one or more polyamines of varied molecular weights and functionalities, or a combination of one or more polyols and one or more polyamines.

The present disclosure also provides the compositions described herein and a thermoset system comprising the compositions, e.g., a first reactive component and a second reactive component, and one or more optional reactive components, such as a third reactive component.

The methods for making a thermoset product described herein, such as a urethane and/or urea-containing polymer thermoset product, include introducing first and second reactive components into a mixing chamber. In one embodiment, the first reactive component includes an isocyanate and the second reactive component includes a polyol and/or polyamine mixture. Thus, in one embodiment, the first reactive component includes an isocyanate and the second reactive component includes a polyol. In one embodiment, the first reactive component includes an isocyanate and the second reactive component includes a polyamine. In one embodiment, the first reactive component includes an isocyanate and the second reactive component includes a polyol and a polyamine. The first and second reactive components have certain characteristics including, but not limited to, viscosity, reactivity, and chemical compatibility.

Viscosity refers to a measure of a fluid's resistance to gradual deformation by shear stress or tensile stress. In one embodiment, viscosity of a first reactive component and a viscosity of a second reactive component can be at least 60 centipoise (cP). Typically, a first reactive component and a second reactive component are formulated with prepolymers so that each component has a viscosity that is from 500 cp to 500,000 cp. In one embodiment, the viscosity range of each component is from 2,000 cp to 5,000 cp. While it is expected that there is no upper limit to viscosity, in one embodiment an upper limit may be no greater than 3,000,000 cp, no greater than 100,000 cp, or no greater than 50,000 cp. Viscosity is measured using a Brookfield viscometer using spindle 27, sample cup SC4-13RD, and at a rotational speed with a torque % between 10 and 90%. A person of ordinary skill in the art will also recognize that viscosity of a mixture can be further altered by including additives such as, but not limited to, thickeners, plasticizers, and solvents, or by changing temperature.

Chemical compatibility refers to the ability of the two reactive components to intimately mix and result in a homogenous mixture or solution. For instance, two aqueous solutions are chemically compatible, and two solutions of organic solvents are chemically compatible; however, an aqueous solution and an organic solvent are not chemically compatible.

There are two basic techniques that can be used to make a thermoset product described herein: a one-shot technique, and a prepolymer technique. In each technique, the combining of first and second reactive components results in a thermoset product with a viscosity that increases as reactants in the first and second reactive components react. The viscosity passes through a value that is low enough for the thermoset product to be extruded out of the mixing chamber and through an extrusion nozzle, and high enough for the thermoset product to have a predetermined layer resolution that is conducive for use in making a 3D object having a predetermined shape resolution.

In one embodiment, the prepolymer technique involves a first reaction between a composition including isocyanate and a composition including a polyol and/or polyamine mixture to produce a prepolymer. As used herein, a "prepolymer" includes, but is not limited to, a urethane and/or urea-containing polymer polymer that results by reacting either polyol and/or polyamine mixture with an excess of isocyanate, or isocyanate with an excess of polyol and/or polyamine mixture. A prepolymer that results from reacting polyol and/or polyamine mixture with an excess of isocyanate is referred to herein as an "isocyanate prepolymer." A prepolymer that results from reacting isocyanate with an excess of polyol and/or polyamine mixture is referred to herein as a "polyol and/or polyamine prepolymer." More than one type of polyol can be used, more than one type of polyamine can be used, and more than one type of isocyanate can be used. In one embodiment, a composition that includes an isocyanate prepolymer can be supplemented with additional isocyanate. The additional isocyanate can be the same isocyanate used to make the isocyanate prepolymer, a different isocyanate, or a combination thereof. In one embodiment, a composition that includes a polyol and/or polyamine prepolymer can be supplemented with additional polyol and/or polyamine prepolymer. The additional polyol and/or polyamine prepolymer can be the same polyol and/or polyamine prepolymer used to make the polyol and/or polyamine prepolymer, a different polyol and/or polyamine prepolymer, or a combination thereof.

The prepolymer differs from the product of the one-shot technique because the prepolymer does not cure into a completely reacted product. In one embodiment, an isocyanate prepolymer has less than 20%, less than 14%, less than 11%, or less than 8.5% unreacted isocyanate groups. In one embodiment, an isocyanate prepolymer has greater than 0.1%, greater than 0.5%, greater than 1%, greater than 2.5%, greater than 5%, or greater than 7% unreacted isocyanate groups. In one embodiment, an isocyanate prepolymer has from 0.5% to 5%, from 2.5% to 8%, or from 5.0% to 8.0% unreacted isocyanate groups. In one embodiment, a polyol and/or polyamine prepolymer has less than 14%, less than 11%, or less than 8.5% unreacted alcohol and/or amine groups. In one embodiment, a polyol and/or polyamine prepolymer has greater 1%, greater than 2.5%, greater than 5%, or greater than 7% unreacted alcohol and/or amine groups.

The prepolymer technique also involves a second reaction between the prepolymer (e.g., the first reactive component) and a polyol and/or polyamine mixture (e.g., the second reactive component). The first and second reactive components are introduced into a mixing chamber for a period of time sufficient to form a partially reacted thermoset product and result in the predetermined layer resolution upon exiting the mixing chamber, and extruding the partially reacted thermoset product out of the mixing chamber through an extrusion nozzle and onto a substrate. The viscosities of the first and second reactive components are typically close enough that a mixing chamber with a static mixer results in sufficient mixing of the two reactive components. Examples of static mixers include 12 fold and 24 fold mixers, blade mixers, and helical mixers. For example, a static mixer can be used when the viscosity of the first reactive component and the viscosity of the second component are within a factor of no greater than 10, no greater than 6, or no greater than 3 of each other. In another embodiment, the viscosities of the two reactive components are different enough to require use of a mixing chamber with an agitator, such as a mechanical agitator or a high pressure impingement mixer. Other non-static mixers include an emulsive mixer, a simple agitated chamber, or a dispersive mixer.

Optionally and preferably, the reaction to produce a thermoset product described herein includes other additives, including but not limited to, a catalyst, a chain extender, a curing agent, a surfactant, a pigment, a dye, a rheology modifier, and a filler such as an inorganic filler. Examples of inorganic fillers include, but are not limited to, silicon oxide, a ceramic pre-cursor, or glass. An additive can be present in the first or second reactive component, or can be separately added to the mixing chamber as the first and second reactive components are being added to the mixing chamber. One or more than one additive can be present (e.g., a catalyst and a chain extender), and more than one type of additive can be present (e.g., a reaction can include dyes, multiple catalysts, multiple chain extenders, rheology modifiers, etc.). In one embodiment, a rheology modifier can alter thixotropic characteristics of a partially reacted thermoset product, and in one embodiment, a rheology modifier does not alter thixotropic characteristics of a partially reacted thermoset product. In one embodiment, a partially reacted thermoset product is not thixotropic, e.g., the partially reacted thermoset product does not decrease in viscosity when exposed to a force such as shaking, agitation, shearing, and the like. In one embodiment, a 3D object described herein does not have a thixotropic characteristic.

A catalyst is a compound that increases the rate of a chemical reaction. In one embodiment, a catalyst does not undergo any permanent chemical change. In another embodiment, a catalyst increases the rate of a chemical reaction and reacts with one or more reactive component. For instance, a catalyst can include hydroxyl, amine, and/or isocyanate functionality.

Chain extenders include low molecular weight highly reactive diols and diamines. In some embodiments, they are designed to form hard segments of two or more urea/urethane linkages between isocyanates. Molecular weights can range from, for instance, 18 to 1,000, in some embodiments with primary hydroxyl or amine termination. Examples include water, butanediol, di-ethylene glycol, hexane diol, E-100, E-300.

In one embodiment, the additive is water. The use of water as an additive in the production of a urethane and/or urea-containing polymer thermoset product results in a polyurethane/polyurea foam.

The completely reacted thermoset product of a 3D object produced using the methods described herein has several characteristics, including, but not limited to hardness, resilience, strength, elasticity, density, durability, abrasion resistance, and flexibility.

Hardness refers to the amount of pressure that needs to be applied to deform the completely reacted thermoset product a certain distance. In one embodiment, a completely reacted thermoset product has a Shore A hardness from 20 to 120. For instance, the hardness can have a minimal Shore A value of at least 20, at least 30, at least 40, at least 50, at least 60, at least 70, at least 80, at least 90, at least 100, at least 110, or at least 120, and a maximum Shore A value of no greater than 120, no greater than 110, no greater than 100, no greater than 90, no greater than 80, no greater than 70, no greater than 60, no greater than 50, no greater than 40, no greater than 30, or no greater than 20. In another embodiment, a completely reacted thermoset product has a Shore D hardness from 3- to 120. For instance, the hardness can have a minimal Shore D value of at least 30, at least 40, at least 50, or at least 60 and a maximum Shore D value of no greater than 120, no greater than 110, no greater than 90, no greater than 80, or no greater than 70. Hardness is measured using a durometer, such as an ASTM D2240 durometer. While the hardness of non-foams can be measured using the Shore hardness scale, foams are typically too soft for the Shore hardness scale. Units of hardness for foams are Indentation Force Deflection (IFD), and the standard is set out by the Polyurethane Foam Association (Joint Industry Foam Standards and Guidelines, Section 4.0, available on the world wide web at www.pfa.org/jifsg/jifsgs4.html), the amount of force, in pounds, required to indent a 50 sq in foot 25% of its thickness, referred to as 25% IFD. In one embodiment, a completely reacted foam thermoset product has a 25% IFD from at least 15 lbs, at least 20 lbs, at least 30 lbs, or at least 35 lbs, to no greater than 60 lbs., no greater than 50 lbs., or no greater than 40 lbs. More rigid foams can also be characterized by compression resistance of 10% deflection, as defined in ASTM D1621, or according to bending strength as defined in EN 12089. In one embodiment, a rigid foam has a compression resistance ranging from 25 to 200 kPa, or a bending strength between 150 kPa and 2000 kPa.

Density refers to the mass of a completely reacted thermoset product per unit volume. In one embodiment, density is the mass of a completely reacted product excluding any filler. In one embodiment, a completely reacted solid thermoset product has a density of at least 0.8 g/mL, or at least 0.9 g/mL, and no greater that 1.3 g/mL or no greater than 1 g/ml. In one embodiment, a completely reacted foam thermoset product has a density of at least 0.05 g/ml, at least 0.1 g/ml, at least 0.5 g/ml, or at least 0.75 g/ml, and no greater than 1 g/ml, or no greater than 0.9 g/ml. Density is found by measuring mass on a material that has a defined geometry and size.

Durability refers to the ability for a part to sustain repeated stresses without failing. Durability can be measured two ways. In one embodiment, a stress-strain test can be performed in accordance with ASTM D638. Briefly, the part can be pulled at a constant strain rate, and the stress at the point at which the part breaks entirely (i.e., one side of the part is detached from the other) is measured. This can be measured when the force is applied in the print direction and transverse to the print direction. If the stress at break is significantly lower in the print direction (less than 75%), then the part is significantly less durable than a part that is fabricated by another means (i.e. injection molded) would be. Using this test a completely reacted thermoset product described herein has a durability of stress at break in the print direction of at least 50%, at least 55%, at least 60%, at least 65%, at least 70%, at least 75%, at least 80%, or at least 85%. In another embodiment, flexural durability is measured in accordance with ASTM D813 or ASTM D430. Briefly, in this method the test specimen is pierced or cracked and then repeatedly bent or stretched. The test measures the increase in size in the hole or the number of cycles required to get to a certain crack size. In parts that are 3D printed, the durability of the part is analyzed when the deformation is in varied directions relative to the print direction. The durability of the part is determined by the weakest direction (i.e., the direction where failure occurred at the lowest number of repeated deformation). As a 3D printing methodology, this disclosure uses a new hardening mechanism as the part is formed: rather than relying on photo-curing of acrylates or cooling to harden, this disclosure carefully times the chemical cure rate of a thermoset. With respect to polyurethanes, polyureas, and polyurethane/polyureas, such a strategy takes full advantage of the mechanical strength of polyurethane thermoset elastomers, which can be superior to photo-cured acrylates or thermoplastic urethanes (TPUs). One innovation to be employed is the specific design and synthesis of urethane precursors, urea precursors, and urethane/urea precursors (prepolymers, such as isocyanate oligomers) and formulation ingredients such as chain extenders, curing agents, and catalysts, to meet the demands for print resolution and z-direction part strength in 3D printing. Durability of FFF fabrication methods are limited by the incorporation of voids between strands during the printing process, with porosity as high as 5-15% range. The methods described herein can facilitate the selection of printing parameters to attain lower porosities such as no greater than 1%.

In one embodiment, a multi-ingredient (e.g., a 3-ingredient, 4-ingredient, a 5-ingredient, 6-ingredient, 7-ingredient, or 8-ingredient) urethane elastomer system is used. For instance, 3 or more reactive components can be used to produce a partially reacted thermoset product. In one embodiment, the resulting 3D object can have one or more properties vary between different areas of the 3D object. In one embodiment, the urethane system can print parts that cure to have a Shore A hardness from 30 to 80. A significant advantage of this system over photo-cured urethane-acrylate or acrylate-rubber systems available on the market is the durability of the parts. Urethane systems are the material of choice for elastomers requiring toughness, abrasion resistance, and low hysteresis, particularly in automotive parts, shoe soles, and prosthetics. Mechanical durability is a property that is helpful to move 3D printing from the domain of prototype development to manufacturing of functional parts. Ratios of reactive components can be controlled to achieved desired stoichiometric ratios. Accordingly, software can be used that controls the relative ratios of reactive components to be utilized in order to achieve, for instance, desired cure profiles, material properties, desired resolution, and processing window (U.S. Provisional Application No. 62/595,400, "Three-Dimensional Printing Control").

In one embodiment, the technology used herein uses a 3D printer which handles delivery of reactive systems (e.g., a first reactive component and a second reactive component). The process of manufacturing the parts uses one or more of the initial viscosities of the reactive components, the viscosity of the mixture exiting the extrusion nozzle, cure rate profiles, and interlayer adhesion (e.g., cross-linking) to determine extrusion amounts, setting times before an additional layer is applied, and so on. Compared to thermoplastic FFF, this product demonstrates advantages with regards to durability, z-direction strength, and porosity.

In the practice of this disclosure, the reactive system has a cure profile that matches the capabilities of the specific printer employed as well as demands for part resolution. A printable partially reacted thermoset product will have value propositions (e.g., characteristics), such as interlayer adhesion and part durability, that will be inherent to the urethane.

Thermoset compositions are chosen such that the reactive components have a viscosity after mixing to maintain part resolution and inhibit layer break-up, e.g., the process by which a liquid stream breaks into droplets. This process is governed by surface tension, and the methods described herein can prevent this phenomenon by slowing the process with a high viscosity, and then solidifying faster than the droplet formation process. The printer includes a mixing chamber or zone designed such that the reactive components are intimately mixed, and with a residence time and optional catalyst level such that the reaction mixture has the required viscosity upon exiting the mixing zone through an extrusion nozzle. The thermoset compositions are chosen such that resolution is achieved but also such that the reaction is not complete when the next layer is deposited, e.g., when the next layer is deposited on a partially reacted thermoset product. In addition, the cure rate of the partially reacted thermoset product is balanced so that it is slow enough that it doesn't clog in the mixer, fast enough that the viscosity is sufficient to inhibit free flow of the part and reduce resolution, and still slow enough in late cure that the next layer will bond. Thus, this disclosure includes balancing cure rate with flow rate and corresponding residence times in a mixer at the printhead. Likewise, in this disclosure the matching viscosities and compatibilities of the two reactive components that will be mixed by adjusting compositions, e.g., viscosities and/or compatibilities can be matched by, for instance, (i) adjusting a ratio of monomeric isocyanate:isocyanate prepolymer in one reactive component, and by adjusting a ratio of polyol and/or polyamine mixture:polyol and/or polyamine prepolymer in the other reactive component, or (ii) adjusting the initial viscosity/molecular weight of the prepolymer as synthesized to match viscosites. The mixing chamber can include static mixing, or mechanical agitation can be used if needed. Also, when materials from finite product set are blended, they can they be blended in such a way that does not sacrifice material durability or cure control.

In any section of the extrusion device where the two reactive components are mixed, clogging can occur. The inventor has observed clogging in two scenarios: 1) gradual buildup of cured material in the mixer due to a combination of insufficient flow rate, fast cure rate, and/or a large distribution of residence times in the mixer, and/or 2) viscosity mismatch and chemical incompatibility between the two components, leading to channeling flow of the low viscosity material past the high viscosity material in the mixer. Furthermore, when flow through the mixer is stopped or started, the mixer can be filled with a disproportionate amount of one component if the viscosities are not similar or controls are not instituted to control the flow of one component separate from the first. Accordingly, in one embodiment the reactive components that are combined to form a mixture have viscosities that are different from each other by no greater than a factor of 3. For instance, the reactive components have viscosities that differ by a ratio of 1 to no greater than 3 (e.g., 1:3), 1 to no greater than 2 (e.g., 1:2), or 1 to no greater than 1 (e.g., 1:1).

In one embodiment, the reactive components have a flow rate through the mixing chamber such that the flow rate of the partially reacted thermoset product is constant at constant pumping pressure and/or load for at least 10 minutes or at least 20 minutes. In one embodiment, the reactive components have a flow rate through the mixer such that the flow rate of the partially reacted thermoset product is reduced by no greater than 5% (at least 95% of initial flow rate), no greater than 10%, no greater than 15%, or no greater than 20% at constant pumping pressure and/or load for at least 10 minutes or at least 20 minutes. In one embodiment, the partially reacted thermoset product does not form clogs in the mixing chamber and/or the extrusion nozzle when flow stops for no greater than 5 seconds, no greater than 10 seconds, or no greater than 30 seconds. In one embodiment, the partially reacted thermoset product does not increase pressure and/or load present in the mixing chamber by more than 10%, more than 15%, more than 20%, or more than 25% from the starting pressure in no greater than 2 minutes, no greater than 5 minutes, no greater than 10 minutes, or no greater than 60 minutes. Maintaining a flow through the mixing chamber, an absence of clogs, or a minimal increase in pressure and/or load can occur when the amounts of first and second reactive components are constant or are changing.

As used herein a "processing window" refers to the range of flow rates for a partially reacted thermoset product through a mixing chamber and extrusion nozzle. The lowest flow rate of a processing window is the slowest flow rate that can be maintained that does not increase pressure and/or load present in the mixing chamber by more than 10%, more than 15%, more than 20%, or more than 25% from the starting pressure in no greater than 2 minutes, no greater than 5 minutes, no greater than 10 minutes, or no greater than 60 minutes. The highest flow rate of a processing window is the fastest flow rate that can be maintained without exceeding the pressure limitations of the printing system, e.g., limitations of the mixing chamber, the pumping system, etc. Printers equipped with capabilities to impart higher pressures to move the fluids will have larger processing windows. Similarly, partially reacted thermoset products that have a slow growth or plateau in viscosity will have a larger processing window. Large processing windows are advantageous for minimizing interruptions due to clogs, speeding print times, and allowing operation with a range of nozzle diameters and resolutions. In view of the teachings of the present disclosure, the skilled person can determine the processing window for a set of reactive components, and alter variables including the types and concentrations of chemicals in reactive components to achieve useful processing windows. In one embodiment, a useful processing window is one where the ratio of the highest flow rate to the lowest flow rate is at least 2, at least 10, at least 25, at least 50, at least 75, at least 100.

An advantage of the methods described herein is that flow rate through the nozzle can give a way to control resolution. With a shorter residence time, or faster flow rate, the partially cured thermoset product will typically have reduced resolution. It can be desirable to shorten overall printing times, and shorter overall printing times can be achieved by moving slowly in areas of the part requiring high resolution, but flowing more quickly in areas of the part that do not require high resolution, such as filling an outlined shape.

This disclosure further encompasses extruder designs wherein the mixing zone is easily replaced. The disclosure further encompasses cleaning methods wherein any clogs of crosslinked material are removed.

A curing thermoset product described herein is deposited as a layer or strand when the diffusion rate of molecules from one layer into another layer is substantially higher, optionally including low molecular weight component curing agents having diffusion rates that are much faster. Furthermore, the density of reactive groups is typically 2-20% by weight, where the density of reactive groups is given as moles of isocyanate or moles of hydroxyl per unit volume as derived from measured NCO or hydroxyl content. % NCO is a standard measurement, and is wt % of NCO functionalities per weight of the formula. Not only is the diffusion rate high, but the opportunity to establish covalent bonds between the layers is substantial. This disclosure permits the flexibility to adjust the density of reaction groups, their reactivity, and their mobility so that strong interlayer adhesion can be achieved, approaching strengths comparable to bulk mechanical properties. Typically, a second layer is deposited on a first layer while the first layer is partially reacted, thereby increasing the interlayer adhesion between the two layers. In one embodiment, the time that can elapse between depositing each layer can be no greater than 0.5 minute, no greater than 1 minute, no greater than 1.5 minutes, no greater than 2 minutes, no greater than 5 minutes, or no greater than 10 minutes. Application of energy, such as heat, can simultaneously speed diffusion and reaction rates. Accordingly, in one embodiment the method includes application of spot or ambient heating at the top layer to simultaneously promote bonding between layers and speed the hardening process.

While not wishing to be bound by theory, it is further postulated that amorphous thermoplastic FFF interfacial strength of existing technologies is hindered by the incorporation of small voids or pores between strands, typically from 45 to 15% (Paul—"Eliminating Voids in FDM Processed Polyphenylsulfone, Polycarbonate, and ULTEM 9085 by Hot Isostatic Pressing", Mary Elizabeth Parker, Research report 2009, South Dakota School of Mines and Technology). These voids exist because the material viscosity is too high to flow and fill the gaps between strands, and leads to mechanical weakness in the printed parts. The partially reacted thermoset product described herein can have a viscosity that is several orders of magnitude lower than the amorphous polymer of existing FFF methods, and therefore can easily flow the short distance required to fill voids between strands and eliminate gaps.

In one embodiment of the reactive system described herein, the part hardness is a kinetic function of the extent of cure. The initial curing component (e.g., the partially reacted thermoset product) is very low viscosity, and the hardness develops as the curing reaction continues. Thus, for a large part, the portions of the part that are printed first are the stiffest, and thus can support weight, while the fresh layers are still soft and able to cure and adhere to subsequent layers. Furthermore, the rate of cure can be adjusted significantly by adjusting the formula reactivity (e.g., the density of reactive groups) and the catalyst levels in order to accommodate larger part designs and prints. The thermoset 3D print system described herein therefore de-couples part size and warpage from the requirements for strong interlayer adhesion.

It has been found that FFF part resolution and surface roughness of existing methods is directly related to the viscosity of the material when it is extruded. PLA, which is a favorite in 3D printing because of its high resolution, has very low viscosity and minimal nonlinear viscoelasticity and die swell. The low viscosity of the partially reacted thermoset product described herein permits the use of lower diameter nozzles. For a given pressure and die length, the volumetric flow rate varies as $R^4/\eta$, where R is the nozzle radius and $\eta$ is the viscosity of a simple fluid; significant drops in viscosity can therefore lead to drops in nozzle radius without sacrificing printing speeds.

Prior to cure, and at room temperature, the methods described herein can result in partially reacted thermoset products having viscosities as low as 1000 cP, without die swell. With viscosities 100-10,000 times lower than the viscosities of typical amorphous polymers, the nozzle radius used in the methods described herein can decrease by a factor of 3 to 10, enabling significantly higher print resolution without changing print speed. Alternatively, ETP printing speed can increase several orders of magnitude without hurting part resolution. ETP printing speed may be slowed by other factors, such as hardening rates of the material and robot head speed, and the skilled person will recognize that these parameters can be controlled and engineered separately.

The shape and size of the tip of the nozzle is not intended to be limiting, because it is expected that nearly any size and shape can be used with the partially reacted thermoset product. The skilled person will recognize that as the size of the nozzle tip decreases, the viscosity of the partially reacted thermoset product being extruded should be increased to compensate for interfacial tension that can break up the strand as it exits the nozzle tip. The skilled person will also recognize that as the size of the nozzle tip increases, the viscosity of the partially reacted thermoset product being extruded should be increased to compensate for the weight of the strand being extruded. A larger strand has a greater tendency to spread.

The thermosets described herein can be cured at mild temperatures, and even room temperature, negating the need for careful thermal control. Thermosets are seldom cured at temperatures above 50° C. These mild temperatures not only enable broad material property versatility within the part and reduced printer cost and design, but can also allow the incorporation of more thermally sensitive components, such as electronics and sensors, during the printing of the part. Furthermore, a thermoset product, such as urethane materials, may be 3D printed upon other metal or plastic parts (including, but not limited to, 3D printed parts) at low temperatures, without inducing thermal warpage or degradation. Accordingly, a 3D object described herein can include more than one type of material. In some embodiments, such as embodiments that use a semi-crystalline polyol (e.g., a polyester polyol), the temperature of the mixing chamber can be elevated above the melting point of the semi-crystalline polyol and then extruded and deposited onto a substrate and exposed to a temperature below the melting point of the semi-crystalline polyol. The subsequent crystallization aids in maintaining the shape of the 3D object while other components of the thermoset cure.

Existing photo-cured acrylate printer systems, such as the 3DS ProJet and the Stratasys Polyjet printers, operate by depositing liquid droplets of acrylates which are subsequently cured by light. By varying the acrylate reactive group density within each droplet, the material properties can be varied at a pixel level. The application of a curing liquid enables strong interlayer adhesion, largely eliminating the strength anisotropy observed in FFF. A disadvantage of these systems is the inkjetting layer thickness and the requisite inkjet printer head size; these attributes limit the scalability and part size for the photo-cured systems. The technology described herein offers similar benefits as the photo-cured systems over FFF of amorphous polymers (strong interlayer adhesion and voxel-level control of material properties). Printing with the thermosets described herein offers enhanced part durability, reduced printer costs, and increased part size.

With respect to foams, numerous applications are envisioned, including orthotics, prosthetics, footwear, grips, seals, gaskets, sound barriers, shock absorption, prosthetic joints, among many others. Products with varied foam properties can be particularly advantageous. For example, informed by pressure-mapping, mattresses can be fabricated to provide ideal support for an individual's weight distribution and preferred sleeping position. Vibration dampening foams can be designed with varied cellular structure and material elasticity to dampen a broad spectrum of vibrations with a minimum amount of material. Space-efficient seating can be built for furnishings or transportation. Energy absorbing safety helmets can be designed with a higher level of comfort and fit. Foam padding can be designed for medical applications (such as wheel chair seating) with conforming fit and reduced pressure points to reduce the incidence of pressure-induced skin ulcers. Areas with open-cell structures can be placed within a structure of closed-cell structures to preferentially channel the flow of air of liquids through the part.

While the following description is in the context of foams, the description applies to thermoset products, including urethane and/or urea-containing polymers in general, both non-foam and foam. Foams are available in a range of hardness and resiliencies. The urethane and/or urea-containing polymer is very durable, permitting the foam to be used repeatedly without a change in properties. This range of properties permits these materials to be used in clinical settings where rigid positioning is required or where pressure distribution is more desirable.

Foams of urethane and/or urea-containing polymers are the product of a reaction between two reactant components. The range of foam properties is achieved by altering the relative weights of formulation components in order to balance reaction speed, interfacial tension of the reacting mixture, and elasticity of the polymeric scaffold. In 3D printing, an extrusion nozzle deposits material, e.g., partially reacted thermoset product, on a substrate layer by layer, following a 3D computer model of the desired 3D object.

The novel foam precursor formulas described herein enable high resolution 3D deposition to form a custom 3D foam object. By partially advancing the reaction of the precursors, such as polyurethane precursors, and adjusting catalyst and surfactant levels, it is possible to deposit the partially reacted thermoset product while maintaining the desired predetermined part resolution and mechanical integrity of the foam.

The production of a foam of urethane and/or urea-containing polymers differs from the production of a non-foam urethane and/or urea-containing polymer by the inclusion of water. Foams of urethane and/or urea-containing polymer are formed by the simultaneous reaction of isocyanates with water to form urea linkages and produce gas, and the reaction of isocyanates with multifunctional high molecular weight alcohols to form a crosslinked elastomeric foam scaffold. The reaction chemistry is illustrated here.

Urea/Gas Evolution Reaction

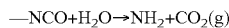

$-NCO + H_2O \rightarrow -NH_2 + CO_2(g)$ isocyanate amine

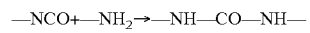

$-NCO + -NH_2 \rightarrow -NH-CO-NH-$ isocyanate+amine urea

Urethane/Polymerization Reaction

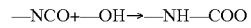

$-NCO + -OH \rightarrow -NH-COO-$ isocyanate+alcohol urethane

The gas evolution forms the porous structure of the foam, while surfactant addition stabilizes the foam structure to maintain a fine cellular structure. The concentrations of catalysts for each reaction, combined with the alcohol reactivity, balance the relative reaction rates so that sufficient polymer weight is built during the gas evolution to form a mechanically stable foam structure. In view of the teachings of the present disclosure, the skilled person can balance these variables, for instance by the inclusion of a blowing agent, to form a mechanically stable foam structure.

The conventional precursors used to make a foam of urethane and/or urea-containing polymers are low viscosity liquids. In typical foaming systems, the reacting liquid mixture is injected into a mold or foaming chamber, and the low viscosity of the liquid allows the mixture to flow and completely fill the mold while it expands. In 3D printing, the low viscosity and flow is undesirable; if the liquid spreads as it is deposited on the platform, the process produces a reacting puddle with little or no form.

While the reacting mixture starts as a liquid, as the polymerization reaction advances, the viscosity of the mixture increases until it ultimately forms a solid, crosslinked network. Before the crosslinked network is formed, the reacting mixture passes through a viscosity that is high enough for high resolution printing. Therefore, the innovation includes precursors and their respective formulas such that the reacting mixture starts at a printable viscosity, and stays at that viscosity long enough to have sufficient working time (e.g., processing window) that the system is robust (FIG. 1). In one embodiment, an excess of isocyanates is pre-reacted with a polyol and/or polyamine mixture to achieve a printable starting viscosity. One of skill in the art can use techniques that are often used in the polyurethane and polyurea industry to reformulate the reactive components and control the speed of gas evolution and the stability of the foam structure.

In one embodiment, foams are formed by reacting simple monomers: a di-isocyanate, water, and multi-functional alcohol, also referred to herein as a polyol, or a multi-functional amine. The quantity of water in the formula affects the foam density, and also the strength of the foam scaffold. The molecular weight of the polyol and/or polyamine mixture determines the crosslink density of the foam scaffold and the resulting elasticity, resiliency, and hardness of the foam. A nearly stoichiometric quantity of di-isocyanate is used in order to fully react with the water and a polyol and/or polyamine mixture.

Prepolymer synthesis is a technique commonly used to alter the cure profile of a polyurethane or polyurea system. In prepolymer synthesis, a stoichiometric excess of di-isocyanate is reacted with a polyol and/or polyamine mixture. The resulting prepolymer has a higher molecular weight than the starting di-isocyanate, though molecules in the pre-polymer have isocyanate functionality and therefore are still reactive. Because of the higher molecular weight, hydrogen bonding, and/or urea linkages, the prepolymer also has a higher viscosity. This prepolymer can be subsequently reacted with a polyol and/or polyamine mixture and water to produce a foam with substantially the same foam scaffold composition that is achievable without prepolymer synthesis. However, viscosity growth profile is altered, typically starting higher, and increasing more slowly, and therefore the morphological features of the foam such as foam cell size and cell stability, can result in a foam with a very different appearance. Foams which start as prepolymers rather than their starting monomer components are common: household spray insulation foams, steering wheels, and microcellular shoe soles are examples.

For precursor design, isocyanate and polyol and/or polyamine mixture components which are commonly employed for cushioning or insulating foams can be used to systematically design prepolymers suitable for high resolution 3D printing. The curing profile of the system can be adjusted by tuning the ratios of the urea and urethane reaction catalysts in order to broaden the time window that the material is at a printable viscosity to, for instance, at least 30 seconds, and achieve a stable foam cellular structure. In one embodiment, a formulation maintains printable viscosity for at least 30 seconds, and a foam density of at most 0.5 g/cm3.

The composition is used in a 3D printer systems such as manufactured by Hyrel 3D (Norcross, Ga.), and in one embodiment the formula is chosen to form a printed foam object.

Once the formula is adequately mixed, the water reaction, which produces gas, is the fastest reaction and the liquid will start to froth and expand. Ultimately, the volume of the liquid increases, for instance 10 to 30 times, to form standard foam densities. If this expansion starts in the mixing zone of the extruder, the froth may emerge from the extruder at a fast, difficult-to-control rate. In this case, the skilled person will recognize that a shorter mixing zone can be used, or a narrower extrusion tip used to provide additional back pressure, therefore keeping the gas dissolved. Once the froth is deposited on the platform, the liquid will continue to expand. The skilled person will recognize that expansion takes place during the time required to print a single layer, and will adapt the robot controls to accommodate printing at the corresponding higher point.

A challenge frequently encountered in 3D printing is the adhesion of the printed layers. Interlayer adhesion of one layer with the next is useful in making an object with strength and integrity in the vertical direction. Interlayer adhesion with the foaming system described herein is significantly improved over the existing amorphous polymer systems, as the slow urethane reaction is responsible for adhesive properties in some of the strongest industrial glues. Because the lower layer is not completely cured when the next layer is deposited, reactive chemical functionalities will be available from the lower layer to react with the next layer, and form strong covalent bonds between the layers. In one embodiment, to achieve sufficient interlayer adhesion, the speed to print a single layer is increased, first by increasing the deposition rate, and next by reducing the part dimensions. In another embodiment, the urethane reaction is decreased by adapting the precursor formula by reducing the urethane reaction catalyst level, increasing the amount of components in a polyol and/or polyamine mixture with slower-reacting, secondary hydroxyl groups, or both. Interlayer adhesion is measured first by manipulation on the final cured object, and validated by multi-directional tensile testing to confirm that the vertical direction strength is at least 50% of the strength of the part in the other directions.

Support foams are not a single density, hardness, or resilience, but can span a wide range of performance. This disclosure extends the foam property range of the formula and foam that was developed. Foam density and hardness are interrelated: low density foams are often softer foams. A range of foam density and hardness can be achieved first by varying the level of blowing agent such as water in the formulation and by adjusting the extent of excess isocyanate in the formula. Increasing the degree of functionality of the components of the polyol and/or polyamine mixture (e.g., incorporating some 4- or 6-functional polyols) increases hardness, and also increases the viscosity growth rate during cure. Foam resilience can be altered by varying the polyols and/or polyamines incorporated in the formula. Memory foams can be achieved by reducing the molecular weight of the polyols and polyamines; high resiliency can be achieved by incorporating graft polyols. In one embodiment, the foam density range is less than 0.3 g/cm3, ranging from 30-50 ILFD hardness, and resilience ranging from 10 to 50%. Foam properties also include open cell content and closed cell content. Open cell foams are defined as cellular structures built from struts, with windows in the cell walls which can permit flow of air or liquid between cells. Closed cells are advantageous for preventing air flow, such as in insulation applications.

The computer in the system of the present disclosure has two basic functions. The first is to help the operator design the 3D object in a way that it can be made. The second is to translate the design into commands to control the robotic motion of the extruder tip, and to deliver these commands in a way so that the object is formed. In some applications, the object design will exist, and the only function of the computer will be to deliver the appropriate commands. The computer may also control the relative ratios of the reactive components in order to control the foam density and mechanical properties throughout the part. A 3D object produced using the methods described herein includes multiple layers. In one embodiment, the number of layers is at least 3, at least 5, at least 10, at least 20, at least 50, or at least 100.

A computer controlled pump or pumps may be used to force reactive components through the mixing chamber and out of the extrusion nozzle. Likewise, appropriate level detection system and feedback networks, well known in the art, can be used to drive a fluid pump or a liquid displacement device to maintain reactive component volumes in the containers.

In addition, there may be additional containers used in the practice of the disclosure, each container having a different type of component, catalyst, water, pigments, and so on that can be selected by the system and added to the first or second reactive component before they are combined in the mixing chamber, or added to the mixing chamber separately. In this regard, the various materials might provide plastics of different colors, or have both insulating and conducting material available for the various layers of electronic products.

The present disclosure satisfies a long existing need in the art for a CAD and CAM system capable of rapidly, reliably, accurately and economically designing and fabricating three-dimensional plastic parts and the like from thermoset starting materials (U.S. Provisional Application No. 62/595, 400, "Three-Dimensional Printing Control").

Further modifications and alternative embodiments of this disclosure will be apparent to those skilled in the art in view of this description. It will be recognized, therefore, that the present disclosure is not limited by these example arrangements. Accordingly, this description is to be construed as illustrative only and is for the purpose of teaching those skilled in the art the manner of carrying out the disclosure.

It is to be understood that the forms of the disclosure herein shown and described are to be taken as the presently preferred embodiments. Various changes may be made in the implementations and architectures. For example, equivalent elements may be substituted for those illustrated and described herein, and certain features of the disclosure may be utilized independently of the use of other features, all as would be apparent to one skilled in the art after having the benefit of this description of the disclosure.

EXEMPLARY EMBODIMENTS

Embodiment 1. A method of creating a three dimensional (3D) object from reactive components that form a thermoset product using extruded thermoset printing, comprising:
providing first and second reactive components that are effective to form a thermoset product having a predetermined layer resolution during the method;
introducing the first and second reactive components into a mixing chamber where mixing occurs to form a mixture,
wherein the first and second reactive components have a residence time in the mixing chamber effective to form a partially reacted thermoset product in the mixing chamber and result in the predetermined layer resolution upon exiting the mixing chamber, and
wherein the first and second reactive components have a residence time in the mixing chamber insufficient to completely react;
extruding the partially reacted thermoset product out of the mixing chamber through an extrusion nozzle and onto a substrate;
moving the extrusion nozzle and/or the substrate to form a 3D object having a predetermined shape resolution.

Embodiment 2. The method of Embodiment 1 wherein the thermoset product comprises a urethane and/or urea-containing polymer.

Embodiment 3. The method of Embodiment 1 or 2
wherein the first reactive component comprises an isocyanate,
wherein the second reactive component comprises a polyol comprising at least one terminal hydroxyl group, a polyamine comprising at least one amine that comprises an isocyanate reactive hydrogen, or a combination of the polyol and the polyamine.

Embodiment 4. The method of any one of Embodiments 1-3 wherein the isocyanate comprises R—(N=C=O)$_n$, where n is at least 2.

Embodiment 5. The method of any one of Embodiments 1-4 wherein the isocyanate is a di-isocyanate (R—(N=C=O)$_2$).

Embodiment 6. The method of any one of Embodiments 1-5 wherein the R comprises an aliphatic group, a cyclic group or a combination thereof.

Embodiment 7. The method of any one of Embodiments 1-6 wherein the cyclic group comprises methylene diphenyl diisocyanate (MDI) or toluene diisocyanate (TDI).

Embodiment 8. The method of any one of Embodiments 1-7 wherein the MDI comprises monomeric MDI, polymeric MDI, or an isomer thereof.

Embodiment 9. The method of any one of Embodiments 1-8 wherein the isomer comprises the chemical formula $C_{15}H_{10}N_2O_2$.

Embodiment 10. The method of any one of Embodiments 1-9 wherein the isomer is 2,2'-MDI, 2,4'-MDI, 4,4'-MDI, or a combination thereof.

Embodiment 11. The method of any one of Embodiments 1-10 wherein the TDI is an isomer of TDI comprising the chemical formula $C_9H_6N_2O_2$.

Embodiment 12. The method of any one of Embodiments 1-11 wherein the isomer comprises 2,4-TDI, 2,6-TDI, or a combination thereof.

Embodiment 13. The method of any one of Embodiments 1-12 wherein the aliphatic group comprises a monomeric di-isocyanate, a blocked polyisocyanate, or a combination thereof.

Embodiment 14. The method of any one of Embodiments 1-13 wherein the monomeric di-isocyanate comprises hexamethylene diisocyanate (HDI), methylene dicyclohexyl diisocyanate, hydrogenated MDI (HMDI), isophorone diisocyanate (IPDI), or a combination thereof.

Embodiment 15. The method of any one of Embodiments 1-14 wherein the HDI comprises hexamethylene-1,6-diisocyanate.

Embodiment 16. The method of any one of Embodiments 1-15 wherein the HMDI comprises dicyclohexylmethane-4,4'diisocyanate.

Embodiment 17. The method of any one of Embodiments 1-16 wherein the blocked polyisocyanates comprise HDI trimer, HDI biuret, HDI uretdione, IPDI trimer, or a combination thereof.

Embodiment 18. The method of any one of Embodiments 1-17 wherein the polyol comprising at least one terminal hydroxyl group comprises a polyester, a polyether, or a combination thereof.

Embodiment 19. The method of any one of Embodiments 1-18 wherein the polyester comprises a compound resulting from condensation of phthalic anhydride and di-ethylene glyol, phthalic anhydride and di-propylene glycol, or adipic acid and butane diol.

Embodiment 20. The method of any one of Embodiments 1-19 wherein the polyether comprises a compound resulting from polymerization of an oxide selected from ethylene oxide, propylene oxide, or butylene oxide, from an initiator selected from glycerol, di-propylene glycol, TPG, castor oil, sucrose, or sorbitol.

Embodiment 21. The method of any one of Embodiments 1-20 wherein the polyol comprises a molecular weight of from 200 Daltons to 20,000 Daltons, such as from 200 Daltons to 10,000 Daltons.

Embodiment 22. The method of any of Embodiments 1-21 wherein the first reactive component comprises a prepolymer.

Embodiment 23. The method of any of Embodiments 1-22 wherein the prepolymer comprises an isocyanate prepolymer that comprises less than 20% unreacted isocyanate groups Embodiment 24. The method of any of Embodiments 1-23 wherein the isocyanate prepolymer comprises greater than 0.1% unreacted isocyanate groups.

Embodiment 25. The method of any of Embodiments 1-24 wherein the prepolymer comprises a polyol and/or amine prepolymer that comprises less than 14% unreacted alcohol groups.

Embodiment 26. The method of any of Embodiments 1-25 wherein the first and second reactive components comprise at least one additive selected from a catalyst, a chain extender, a curing agent, a surfactant, a pigment, a dye, a rheology modifier, a filler, or a combination thereof.

Embodiment 27. The method of any of Embodiments 1-26 wherein the first and second reactive components each comprise a viscosity of at least 60 centipoise (cP).

Embodiment 28. The method of any of Embodiments 1-27 wherein the first and second reactive components each comprise a viscosity from 500 cp to 500,000 cp.

Embodiment 29. The method of any of Embodiments 1-28 wherein the partially reacted thermoset product comprises a viscosity below 3,000,000 cP upon exiting the mixing chamber.

Embodiment 30. The method of any of Embodiments 1-29 wherein the partially reacted thermoset product does not increase pressure present in the mixing chamber by more than 20% in 5 minutes.

Embodiment 31. The method of any of Embodiments 1-30 wherein the ratio of viscosity of the first and second reactive components is from 1:3 to 3:1.

Embodiment 32. The method of any of Embodiments 1-31 wherein the substrate comprises a stage.

Embodiment 33. The method of any of Embodiments 1-32 wherein the substrate comprises a previously formed and partially reacted thermoset product, or a previously formed and completely reacted thermoset or thermoplastic product, or a metal product.

Embodiment 34. The method of any of Embodiments 1-33 wherein the 3D object comprises more than one type of material.

Embodiment 35. The method of any of Embodiments 1-34 wherein the 3D object comprises a solid thermoset product.

Embodiment 36. The method of any of Embodiments 1-35 wherein the solid thermoset product comprises a Shore A hardness of 20 to 120.

Embodiment 37. The method of any of Embodiments 1-36 wherein the solid thermoset product comprises a Shore D hardness of at least 30 to no greater than 120.

Embodiment 38. The method of any of Embodiments 1-37 wherein the 3D object comprises a foam thermoset product.

Embodiment 39. The method of any of Embodiments 1-38 wherein the foam comprises a 25% IFD hardness of at least 15 lbs. to no greater than 60 lbs.

Embodiment 40. The method of any of Embodiments 1-39 wherein the foam comprises a compression resistance at 10% deflection of 25 to 200 kPa.

Embodiment 41. The method of any of Embodiments 1-40 wherein the foam comprises a bending strength of 150 and 2000 kPa.

Embodiment 42. The method of any of Embodiments 1-41 wherein the foam comprises a density of no less than 0.05 gram/milliliter (g/ml) to no greater than 1.3 g/ml.

Embodiment 43. A 3D object comprising a completely reacted thermoset product, wherein the completely reacted thermoset product comprises a solid thermoset product and a foam thermoset product, wherein a portion of the solid thermoset product and a portion of the foam thermoset product are covalently bonded.

Embodiment 44. The 3D object of Embodiment 43 wherein the solid thermoset product comprises a Shore A hardness of 20 to 120.

Embodiment 45. The 3D object of any of Embodiments 43 or 44 wherein the solid thermoset product comprises a Shore D hardness of at least 30 to no greater than 120.

Embodiment 46. The 3D object of any of Embodiments 43-45 wherein the foam thermoset product comprises a 25% IFD hardness of at least 15 lbs. to no greater than 60 lbs.

Embodiment 47. The 3D object of any of Embodiments 43-46 wherein the foam comprises a density of no less than 0.05 g/ml to no greater than 1.3 g/ml.

Embodiment 48. The 3D object of any of Embodiments 43-47 wherein the hardness of the foam thermoset product varies between two separate areas of the foam thermoset product of the 3D object.

Embodiment 49. The 3D object of any of Embodiments 43-48 wherein the density of the foam thermoset product varies between two separate areas of the foam thermoset product of the 3D object.

Embodiment 50. A 3D object comprising a completely reacted solid thermoset product, wherein the hardness of the completely reacted solid thermoset product varies between two separate areas of the solid thermoset product of the 3D object.

Embodiment 51. The 3D object of Embodiment 50 wherein the solid thermoset product comprises a Shore A hardness of 20 to 120.

Embodiment 52. The 3D object of any of Embodiments 50 or 51 wherein the solid thermoset product comprises a Shore D hardness of at least 30 to no greater than 120.

Embodiment 53. A 3D object comprising a completely reacted foam thermoset product, wherein the hardness of the completely reacted foam thermoset product varies between two separate areas of the solid thermoset product of the 3D object.

Embodiment 54. The 3D object of Embodiment 53 wherein the foam thermoset product comprises a 25% IFD hardness of at least 15 lbs. to no greater than 60 lbs.

Embodiment 55. A 3D object comprising a completely reacted foam thermoset product, wherein the density of the completely reacted foam thermoset product varies between two separate areas of the solid thermoset product of the 3D object.

Embodiment 56. The 3D object of Embodiment 55 wherein the foam comprises a density of greater than 0.05 g/ml to no greater than 1.3 g/ml.

Embodiment 57. The method of any of Embodiments 1-42 further comprising providing one or more additional reactive components, wherein the one or more additional reactants are introduced into the mixing chamber.

Embodiment 58. The method of any of Embodiments 1-42 or 57 wherein introducing the one or more additional reactive components results in a 3D object comprising a property that varies between two separate areas of the 3D object.

Embodiment 59. The method of any of Embodiments 1-42, 57, or 58 wherein the property that varies comprises hardness, density, or a combination thereof.

Embodiment 60. The method of any of Embodiments 1-42 or 57-59 wherein the 3D object comprises a solid thermoset product.

Embodiment 61. The method of any of Embodiments 1-42 or 57-60 wherein the 3D object comprises a foam thermoset product.

Embodiment 62. The method of any of Embodiments 1-42 or 57-6139-43 wherein the 3D object comprises solid thermoset product and foam thermoset product.

Embodiment 63. A thermoset system comprising a first and a second reactive component, wherein the first component comprises a polyol and/or amine prepolymer, a fast reactant, and a slow reactant, wherein the first component comprises 1% to 10% fast reactant and 1% to 75% slow reactant, and wherein the second component comprises an isocyanate prepolymer that comprises a monomeric isocyanate.

Embodiment 64. The thermoset system of Embodiment 63 wherein the fast reactant comprises a chain extender.

Embodiment 65. The thermoset system of Embodiment 63 or 64 wherein the chain extender comprises a di-amine, water, a primary hydroxyl reaction group, or a combination thereof.

EXAMPLES

Liquid blends of isocyanate prepolymers and neat isocyanates were prepared at various ratios to form an isocyanate component, and then were mixed with a formulation of polyols, amines, and catalysts. The mixture of the two components was extruded through a static mixer at a given rate and residence time.

Final properties of the exiting materials were measured using a Shore A hardness gauge. A viscosity profile was created using Brookfield viscometer measurements utilizing different viscometer temperature settings and torque ranges to determine and predict the speed of reaction of the formulated materials.

Monomeric MDI (Diphenymethane-4,4'-diisocyanate) was obtained from BASF Corporation (Lupranate MI). Technical grade TDI (80% Tolylene-2,4-diisocyanate, 20% Tolylene-2,6-diisocyanate) was obtained from Sigma-Aldrich. Pluracol polyols were obtained from BASF Corporation. Ethacure 100 and Ethacure 300 amines were obtained from Albemarle Corporation.

Isocyanate Prepolymer Syntheses

Pluracol 1010 TDI Prepolymer: 72 wt % Pluracol 1010, 28% TDI.

Pluracol 2010 TDI Prepolymer: 83.6 wt % Pluracol 2010, 16.4% TDI.

Pluracol 1010 MDI Prepolymer: 64 wt % Pluracol 1010, 36 wt % Lupranate MI.

Pluracol 2010 MDI Prepolymer: 80% Pluracol 2010, 20% Lupranate MI.

Isocyanate was heated in the reaction vessel to 80° C. Polyol was added over two hours while maintaining the reaction temperature between 80 and 85° C. Reaction vessel was maintained at 80° C. for an additional two hours. Reaction mixture was stirred and blanketed with nitrogen throughout the reaction. At the end of the reaction, the mixture was cooled and poured into storage.

Polyol Prepolymer Synthesis

Polyol Prepolymer 1: Pluracol polyol was heated to 80° C. Isocyanate addition rate was set to add entire amount over two hours. After 75 minutes, butanediol addition was commenced such that the butanediol was added over 45 minutes. After addition was completed, reaction mixture was held for two hours. During entire reaction, temperature was held between 80 and 85° C. Reaction mixture was stirred and blanketed with nitrogen through the reaction. At the end of the reaction, the mixture was cooled and poured into storage. Composition was 62% Pluracol 1010, 26.8% Lupranate MI, 11.2% butanediol.

Polyol Prepolymer 2: Butanediol was heated to 80° C. Isocyanate prepolymer was added over two hours. Reaction mixture was held for two hours. During entire reaction, temperature was held between 80 and 85° C. Reaction mixture was stirred and blanketed with nitrogen through the reaction. At the end of the reaction, the mixture was cooled and poured into storage. Composition was 12% butanediol, 88% PI 1010 MDI prepolymer.

Mixing Properties

An isocyanate formula and a polyol were loaded into syringes and pumped through a junction to a static mixer. At the end of the static mixer, the combined materials flowed through a nozzle. The static mixer had a volume of 2.37 mL and included 12 mixing elements. Total flow rates were varied from 2 to 8 mL/min.

The examples below show that the relative viscosities of the component formulas affected the quality of the mixing in the static mixer. Mixing quality was rated from 1 to 3. Mixing rated as a "1" was poor: visual observations of the material inside the mixer and exiting the mixer showed distinct material separation. Mixing rated as a "2" appeared mixed upon exiting the mixer, but the final part had a noticeable swirl pattern and had a liquid residue on the surface. Mixing rated as a "3" was excellent: the completely reacted material cured and had final properties indistinguishable from material that was vigorously mixed in a cup and cured.

The isocyanate formula was either straight prepolymer or a blend of monomeric isocyanate and an isocyanate prepolymer. The polyol formula was a blend of amine, polyol, and catalyst. In Example 1, an isocyanate formula with a viscosity of 8000 cps was mixed with a polyol formula with a viscosity of 100 cps, and showed poor mixing. In Example 5, an isocyanate formula with viscosity of 7000 cps and a polyol formula with viscosity of 2500 cps showed excellent mixing.

TABLE 1

| Example | Reference Number | Prepolymer Isocyanate Type/Mix | Mix ratio | Isocyanate formula viscosity (CPS) | Polyol formula viscosity (CPS) | Mixing Quality result |
| --- | --- | --- | --- | --- | --- | --- |
| 1 | C3DM1-38 | TDI 100% | 6.32:1 | 8000 | 100 | 1 |
| 2 | C3DM1-40 | TDI 100% | 10.25:1 | 5000 (25° C.) | 100 | 1 |
| 3 | C3DM1-43 | TDI 100% | 10.25:1 | 1000 (50° C.) | 100 | 2 |
| 4 | C3DM1-70 | MDI 80/20 | 1:1.2 | 7000 | 100 | 1 |
| 5 | C3DM4-22 | MDI 80/20 | 1.1:1 | 7000 | 2500 | 3 |

TABLE 2

| | Formulas | | | | |
| --- | --- | --- | --- | --- | --- |
| | C3DM1-38 | C3DM1-40 | C3DM1-43 | C3DM1-70 | C3DM4-22 |
| A-side | | | | | |
| Pl 1010 TDI prepolymer | 100% | | | | |
| Pl 2010 TDI prepolymer | | 100% | 100% | | |
| Pl 1010 MDI prepolymer | | | | 79.7% | 80% |
| MDI | | | | 20.3% | 20% |
| B-side | | | | | |
| Ethacure 300 | 23.8% | | | | 7.2% |
| Ethacure 100 | 69.2% | 100% | 100% | 5.0% | 7.2% |
| Pl 1010 | 7.0% | | | 93.2% | 64.0% |
| Polyol prepolymer 2 | | | | | 27.5% |
| Dabco 33LX | | | | 1.0% | 0.7% |
| Dabco T12 | | | | 0.8% | 0.6% |

Viscometer settings: Isocyanate formulas C3DM1-38,40, 43 used spindle 31 at 6 RPM. Formulas C3DM1-70 and C3DM4-22 used spindle 27 at 6 RPM. All measurements at 20° C. except for sample C3DM1-43 which was measured at 50° C. Polyol formulas C3DM1-38, 40, 43, 70 were measured at 20° C., 30 RPM, Spindle 18. Polyol formula for C3DM4-22 used spindle 27 at 20° C., 6 RPM.

Viscosity Growth During Cure

Viscosity growth rate during cure is a useful parameter for achieving printable materials.

Examples below show that different formulas yield different viscosity profiles after being mixed. Formulation changes related to the concentration of reactive groups, reactivity of formula components, and catalyst levels can independently affect the growth of viscosity during cure.

The viscosity profiles were measured by rapidly mixing the two formula components, pouring 10 grams of the reacting mixture into a Brookfield viscometer sample cup, and then recording the viscosity as a function of time.

Examples 1 and 2

Pure Isocyanate Vs Prepolymer

In the first example, the formula (C3DM1-85) used an isocyanate formula with Toluene di isocyanate (TDI) 87 g/mol of isocyanate. The isocyanate formula was reacted with a mixture of Ethacure 100 and Pluracol 201f0, with a reaction equivalent density of 482 g/mol. The isocyanate and polyol formulas were mixed with a ratio of 1:5.28 for a 4% stoichiometric excess of isocyanate.

In the second example, the formula (C3DM1-81) used an isocyanate formula with 870 g/mol isocyanate. This isocyanate formula contained a prepolymer made by reacting Pluracol 2010 with MDI with the entire polyol content of the first reaction pre-reacted with the isocyanate. This formula was reacted with an amine Ethacure 100 with a reaction equivalent density of 89 g/mol. The isocyanate and amine chain extender formulas were mixed with a ratio of 10.2:1 for a 4% stoichiometric excess of isocyanate.

Example 1 had a very high density of highly labile isocyanate groups, and cured very quickly, while Example 2 had a density of isocyanate groups which is ten times lower, and cured much more slowly. The formulas used are given below:

TABLE 3

| C3DM1-85 | |
| --- | --- |
| | Amount (g) |
| A-side | |
| TDI | 1.93 |
| B-side | |
| PL2010 polyol | 9.16 |
| Ethacure 100 | 1.04 |

TABLE 4

| C3DM1-81 | |
| --- | --- |
| | Amount (g) |
| A-side | |
| PL2010 TDI prepolymer | 15.48 |
| B-side | |
| Ethacure 100 | 1.52 |

TABLE 5

| Time (min) | Example 1 C3DM1-85 Viscosity (cps) | Example 2 C3DM1-81 Viscosity (cps) |
| --- | --- | --- |
| 0 | 1,000 | 5,000 |
| 1 | 300,000 | |
| 1.5 | 780,000 | |
| 2 | cured | 5650 |
| 3 | | 11,000 |
| 4 | | 34,100 |
| 5 | | 59,000 |
| 6 | | 91,000 |
| 10 | | 708,000 |

Viscometer settings: 22° C., 0.3 RPM, spindle 27.

Examples 3 and 4

Effect of Catalyst

These examples show the effect of different catalyst on the cure rate. Example 3 (C3DM-86) had a different catalyst than Example 4 (C3DM1-102). Samples with different catalysts were mixed and poured into a Brookfield viscosity cup, in a temperature chamber set at 22° C., and the measurements were taken at the time intervals. The formulas used are given below:

TABLE 6

| C3DM1-86 | |
| --- | --- |
| | Amount (g) |
| A-side | |
| PL2010 TDI prepolymer | 16.04 |
| B-side | |
| Ethacure 100 | 1.56 |
| Dabco 33LX | 0.049 |

TABLE 7

| C3DM1-102 | |
| --- | --- |
| | Amount (g) |
| A-side | |
| PL2010 TDI prepolymer | 15.02 |
| B-side | |
| PL2010 polyol | 3.49 |
| Ethacure 100 | 1.177 |
| KKAT XK-618 | 0.205 |

TABLE 8

| Time (min) | Example 3 C3DM1-86 Viscosity (cps) | Example 4 C3DM1-102 Viscosity (cps) |
| --- | --- | --- |
| 0 | 5,000 | 5,000 |
| 2 | 25,500 | 12,500 |
| 3 | 66,700 | 12,500 |
| 4 | 210,000 | 12,500 |
| 5 | 569,000 | 12,500 |

TABLE 8-continued

| Time (min) | Example 3 C3DM1-86 Viscosity (cps) | Example 4 C3DM1-102 Viscosity (cps) |
|---|---|---|
| 6 | cured | 13,333 |
| 7 | | 33,500 |
| 8 | | 48,333 |
| 10 | | 145,000 |
| 11 | | 240,000 |
| 12 | | 398,000 |

Viscometer settings: 22° C., 0.3 RPM, spindle 27.

Example 5

Effect of Temperature on Cure Rate

Identical samples were prepared and the viscosity growth was measured at 22° C. and 50° C. To record viscosity at the higher temperature, the initial components were heated to 50° C., mixed, and then poured into a viscometer cup with a temperature-control jacket plumbed to a circulating bath. The formulas used are given below:

TABLE 9

| C3DM1-99 | Amount (g) |
|---|---|
| A-side | |
| PL2010 TDI prepolymer | 16.01 |
| B-side | |
| Ethacure 100 | 1.5732 |
| KKAT XK618 | 0.0855 |

TABLE 10

| C3DM1-100 | Amount (g) |
|---|---|
| A-side | |
| PL2010 TDI prepolymer | 18.015 |
| B-side | |
| Ethacure 100 | 1.7853 |
| KKAT XK618 | 0.1222 |

TABLE 11

| Time (min) | C3DM1-99 22° C. Viscosity (cps) | C3DM1-100 50° (cps) |
|---|---|---|
| 2 | | 36,500 |
| 2.5 | 39,167 | 56,600 |
| 3 | 40,000 | 85,000 |
| 4 | 41,667 | 112,000 |
| 5 | 86,333 | 278,000 |
| 6 | 142,000 | 534,000 |
| 7 | 250,000 | cured |
| 8 | 459,000 | |
| 9 | 793,000 | |

Viscometer settings: 22° C., 0.3 RPM, spindle 27. The prepolymer for formula C3DM1-100 was heated to 50° C. before use.

Example 6

Example of Effect of Different Isocyanate Prepolymers on Cure Rate

Two isocyanate formulas were reacted with an identical polyol formula. The isocyanate formula for C3DM4-50 had 20% TDI (toluene di-isocyanate) and 80% Pluracol 1010 TDI prepolymer. The isocyanate formula for C3DM4-28 had 20% monomeric MDI and 80% Pluracol 1010 MDI prepolymer. Each were mixed with a 5% stoichiometric excess of the polyol formula.

Figure 2:
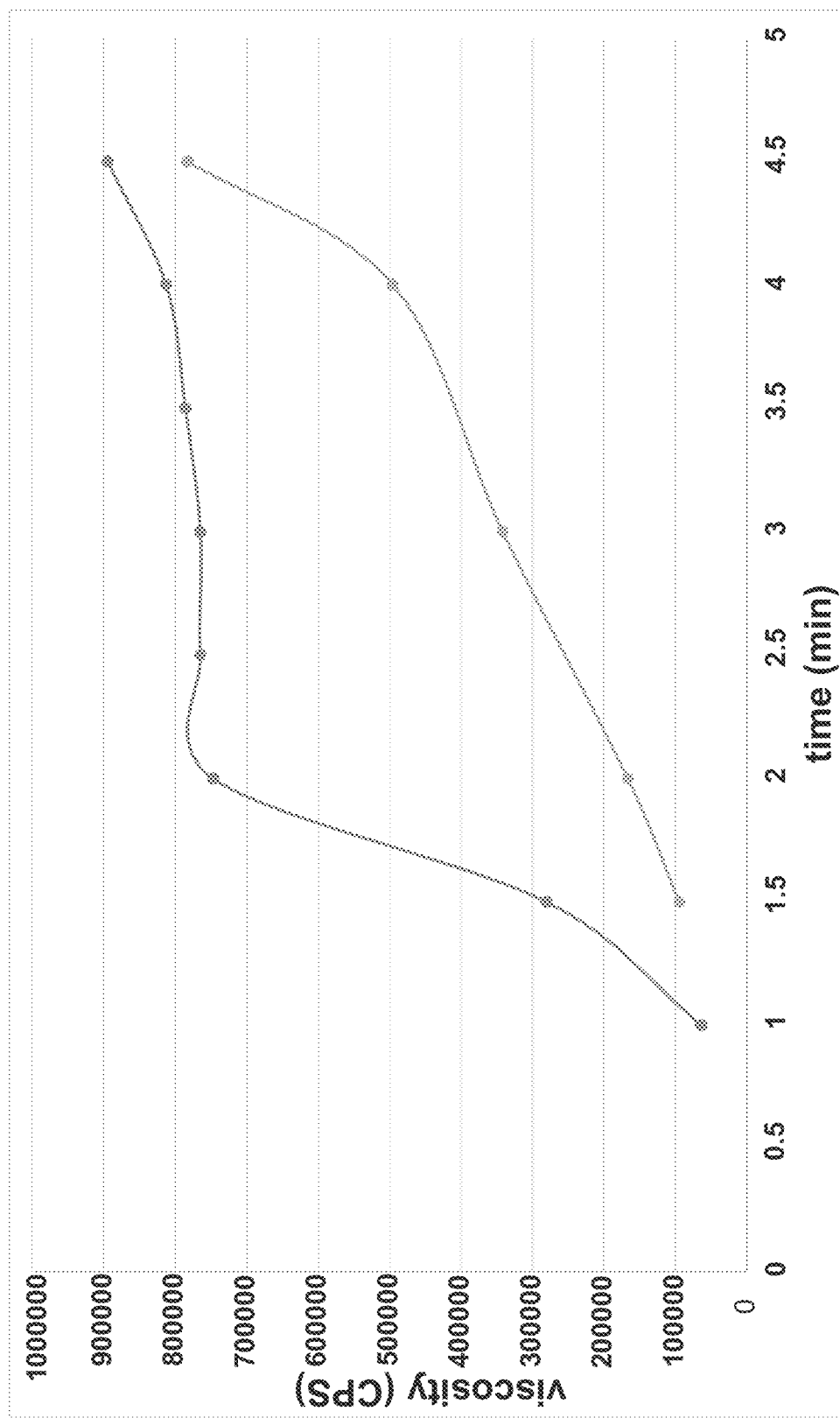
FIG. 2 shows the viscosity growth of the TDI-based formula (top left trace) and the MDI-based formula (bottom right trace). Viscometer settings: 22C, spindle 27, 0.3 RPM.

The isocyanate groups on TDI do not have equivalent reactivities, whereas the isocyanate groups on MDI have equivalent reactivity. It was observed that the TDI-based formula had a rapid increase in viscosity, followed by a plateau, whereas the MDI-based formula had a more steady increase in viscosity (FIG. 2). The formulas used are given below:

TABLE 12

| C3DM4-50 | Amount (g) |
|---|---|
| A-side | |
| PL1010 TDI prepolymer | 24.03 |
| TDI | 6.01 |
| B-side | |
| PL1010 polyol | 19.77 |
| Polyol Prepolymer 2 | 10.67 |
| Ethacure 100 | 0.88 |
| Ethacure 300 | 3.69 |
| KKAT XK618 | 0.19 |

TABLE 13

| C3DM4-28 | Amount (g) |
|---|---|
| A-side | |
| PL1010 MDI prepolymer | 12.05 |
| MDI | 3.03 |
| B-side | |
| PL1010 polyol | 7.99 |
| Polyol Prepolymer 1 | 4.31 |
| Ethacure 100 | 0.36 |
| Ethacure 300 | 1.49 |
| KKAT XK618 | 0.11 |

Example 7

Printability and Mixer Residence Time

In this example, we demonstrate how the viscosity growth rate of two partially reacted thermosets interact with the volumetric flow rate and volume of the mixer to define a set of flow rates for which the partially reacted thermosets are printable. Both formulas produce a polymer with a Shore A hardness of approximately 50. The formulas used are given below:

TABLE 14

Fast formula

| Isocyanate | Wt % | Polyol | Wt % |
| --- | --- | --- | --- |
| Lupranate MI | 20 | Ethacure 100 | 8.5 |
| Pl1010 MDI prepolymer | 80 | Pluracol 1010 | 59 |
|  |  | Polyol prepolymer 2 | 32 |
|  |  | Dabco T12 | 0.25 |
|  |  | Dabco 33LX | 0.25 |
| Starting viscosity Spindle 27, 6RPM | 5300 cp 25° C. |  | 2660 cp 20° C. |

TABLE 15

Slow formula

| Isocyanate | Wt % | Polyol | Wt % |
| --- | --- | --- | --- |
| Lupranate MI | 20 | Ethacure 100 | 3.5 |
|  |  | Ethacure 300 | 7.0 |
| Pl1010 MDI prepolymer | 80 | Pluracol 1010 | 58 |
|  |  | Polyol prepolymer 2 | 31 |
|  |  | KKat XK-618 | 0.5 |
| Starting viscosity Spindle 27, 6RPM | 5300 cp 25° C. |  | 2500 cp 20° C. |

The fast formula system cures too quickly to measure viscosity growth. In the 30 seconds that it takes to mix, the material solidifies too much to pour into the viscometer cup.

Figure 3:
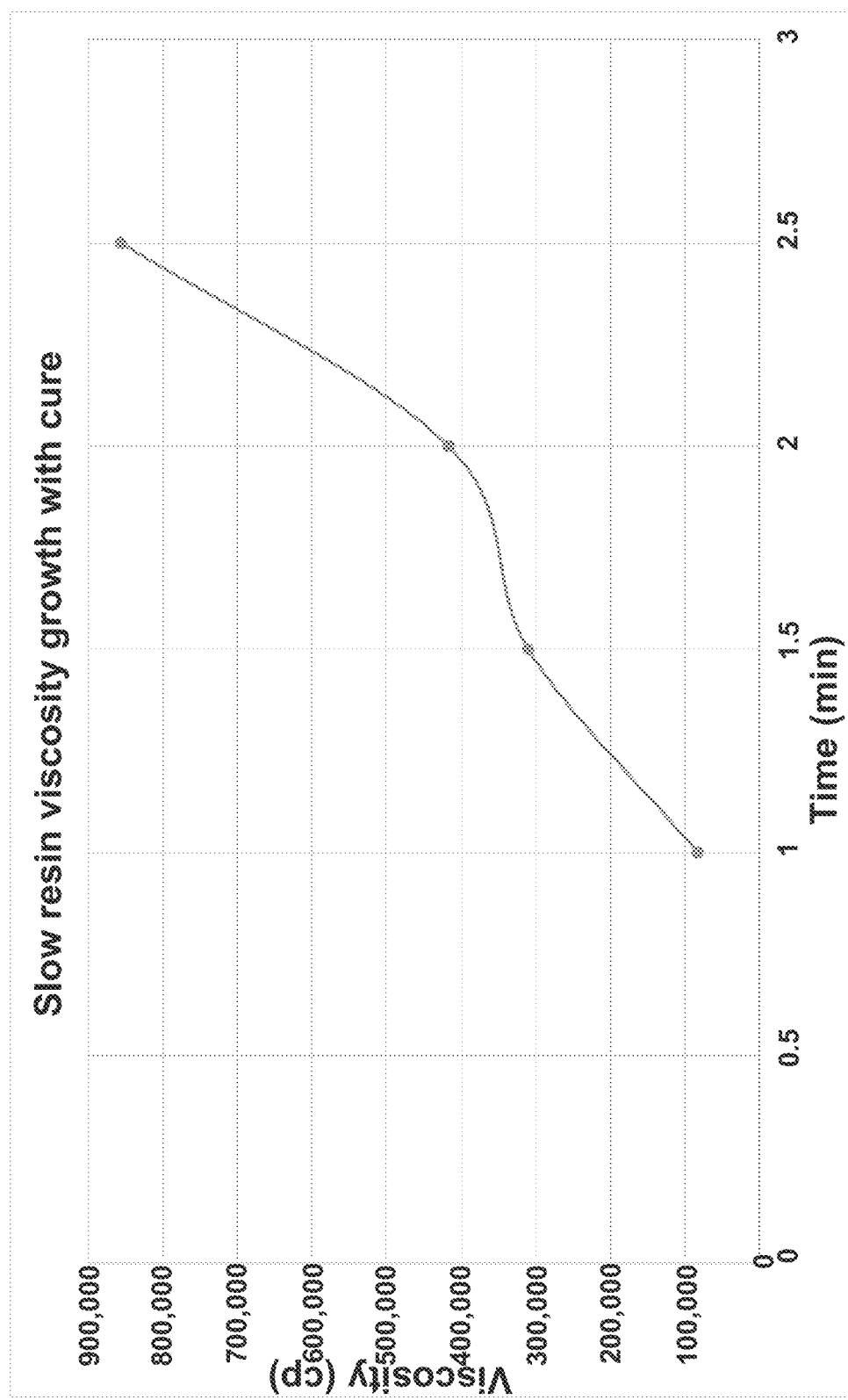
FIG. 3 shows the viscosity growth of the slow formula system of Example 7.

The viscosity growth of the slow formula system is shown in FIG. 3. The viscosity increases two orders of magnitude, to approximately 1,000,000 cps, in 3 minutes. Viscometer settings: 22° C., spindle 27, 0.3 RPM.

Figure 4:
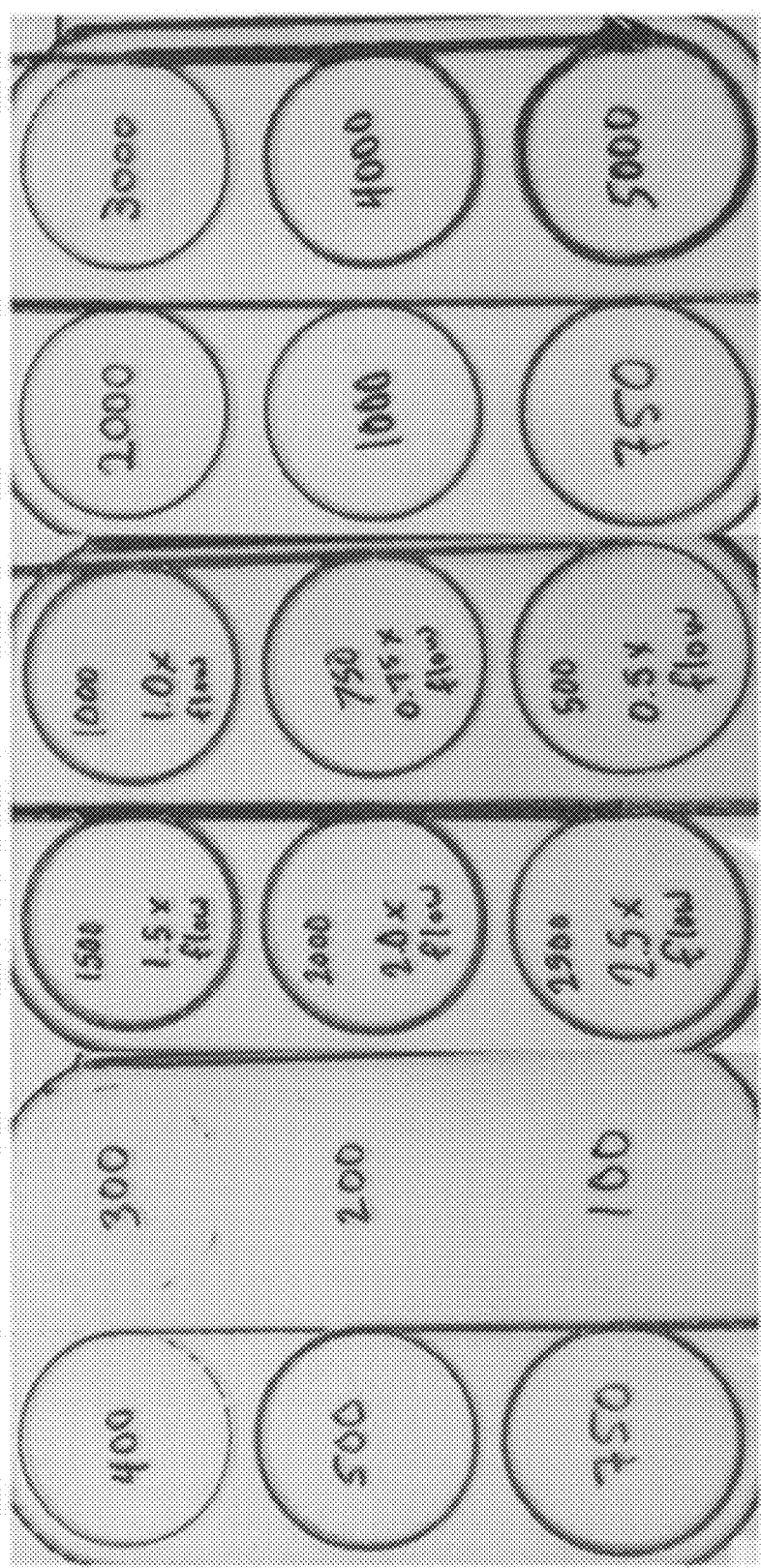
FIG. 4 shows a fast formula processing window. The values in columns 1, 2, 3, 4, 5, and 6 refer to a flow rate of millimeters per minute (mm/min).
Figure 5:
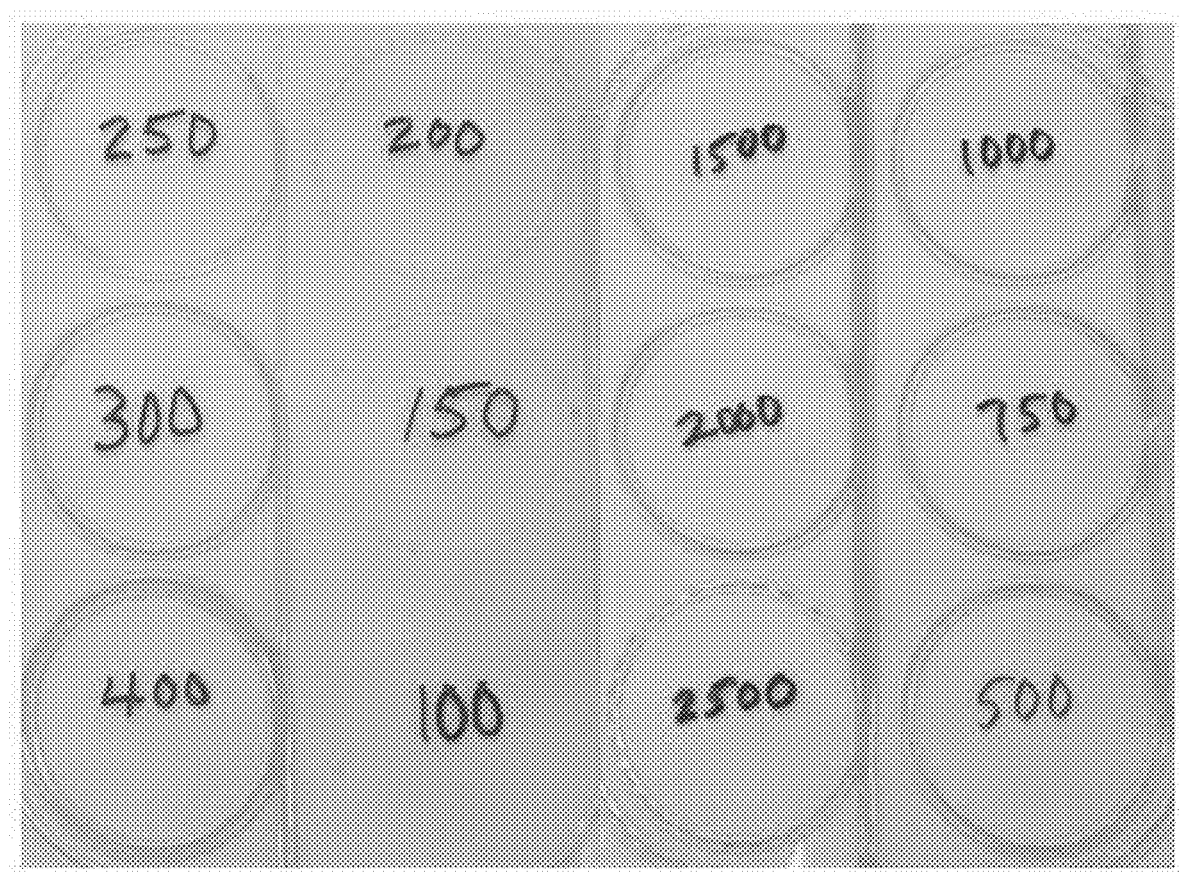
FIG. 5 shows a slow formula processing window. The values in the columns 1, 2, 3, and 4 refer to a flow rate of millimeters per minute (mm/min).

To illustrate the processing window of the formulas, we printed a single layer circle at various flow rates (FIG. 4 and FIG. 5). The two components had a mix ratio of 1:1, and were pumped through a static mixer nozzle with a volume of 250 µL. For the fast formula, below 500 mm/min (FIG. 4, upper circle in column 1, and all circles in column 2) (400 µL/min, 37.5 sec residence time) the flow stops, and above 2500 mm/min (FIG. 4, lower circle in column 3 and all circles in the 6$^{th}$ column) (2000 µL/min, 7.5 sec residence time), the line thickness varies and then spreads. The fast formula had a processing window spanning residence times ranging from 7.5-37.5 seconds. For the slow formula, below 250 mm/min (FIG. 5, upper circle in column 1 and all circles in column 2) (200 µL/min, 75 sec residence time), the flow stops, and above 2000 mm/min (FIG. 5, middle circle in column 3 and lower circle in column 4) (1600 µL/min, 9.4 sec residence time), the line thickness varies. The slow formula had a broader processing window spanning 9.4-75 seconds.

Example 8

Multi-Layer Printing

Figure 6:
FIG. 6 shows a 3D object created as described in Example 8.

Formula C3DM4-71 was printed on a Hyrel 3D printer. The printer parameters were set such that material was pumped through the mixer at 1296 µL/min. The mixer had a volume of approximately 250 µL and a tip nozzle diameter of 0.8 mm. Three adjacent concentric circles were deposited on the printing surface, and subsequent layers were continually deposited for a total of 29 layers (FIG. 6). After the printing process, the structure was heated in a 50° C. oven for 30 minutes. The formula used is given below:

TABLE 16

C3DM4-71

|  | Amount (g) |
| --- | --- |
| A-side |  |
| PL1010 MDI prepolymer | 80 |
| MDI | 20 |
| B-side |  |
| PL1010 polyol | 71.17 |
| Polyol prepolymer 1 | 20.63 |
| Ethacure 100 | 4.18 |
| Ethacure 300 | 7.33 |
| KKAT XK618 | 0.70 |

Example 9

Foam Printing

Formula C3DM4-64 was printed on a Hyrel 3D printer. The printer parameters were set such that material was pumped through the mixer at 450 µL/min. The mixer had a volume of approximately 1000 µL and a tip nozzle diameter of 1.75 mm. Three adjacent concentric circles were deposited on the printing surface, and subsequent layers were continually deposited for a total of 70 layers. As the layers were deposited, lower layers foamed and expanded. The formula used is given below:

TABLE 17

Formula C3DM4-64

| Isocyanate | Wt % | Polyol | Wt % |
| --- | --- | --- | --- |
| Lupranate MI | 40 | Ethacure 300 | 2.1 |
| Pluracol 1010 MDI prepolymer | 60 | Ethacure 100 | 2.1 |
|  |  | water | 4 |
|  |  | Pluracol 2010 | 16.75 |
|  |  | Pluracol 1135i | 75 |
|  |  | Stannous Octanoate | 0.6 |
|  |  | Dabco DC 5043 | 0.4 |

Example 10

Print Parameter Effects on Part Geometry

A hollow cylinder of formula C3DM4-105 was printed by continuously depositing a single circle of material on a printing platform. A Sulzer Mixpac Statomix EA3.0-13SA 13 element static mixer was attached to a 1:1 dual cartridge which was controlled by the printer. For each part, 20 layers were deposited. Parameters such as the time per layer and the volumetric flow rate of the partially reacted thermoset product were seen to impact the final part geometry. These parameters can be controlled to achieve the desired part resolution.

TABLE 18

| Band Diameter (mm) | Printhead Linear Speed (mm/min) | Part Height (mm) | Band Thickness (mm) | Time Per Layer (sec) | volumetric flow rate (microliter/sec) |
|---|---|---|---|---|---|
| 100 | 800 | 7.9 | 4.2 | 25 | 86.4 |
| 100 | 500 | 9.6 | 3.2 | 38 | 54 |
| 100 | 350 | 11.2 | 2.9 | 54 | 37.8 |
| 100 | 250 | 11.7 | 2.6 | 75 | 27 |
| 90 | 350 | 10.8 | 3.0 | 49 | 37.8 |
| 80 | 350 | 10.3 | 3.0 | 45 | 37.8 |
| 70 | 350 | 10.0 | 3.2 | 38 | 37.8 |
| 60 | 350 | 9.8 | 3.4 | 33 | 37.8 |
| 50 | 350 | 9.0 | 3.6 | 27 | 37.8 |
| 30 | 350 | 7.3 | 4.6 | 17 | 37.8 |
| 20 | 350 | 6.1 | Flowed part | 11 | 37.8 |
| 10 | 350 | 4.5 | Flowed part | 6 | 37.8 |

TABLE 19

Formula C3DM4-105

| Isocyanate | Wt % | Polyol | Wt % |
|---|---|---|---|
| Lupranate MI | 20 | Ethacure 300 | 7.0% |
| Pluracol 1010 MDI prepolymer | 80 | Ethacure 100 | 4.0% |
| | | Pluracol 1010 | 66.8% |
| | | Pluracol 1135i | 10.0% |
| | | Polyol Prepolymer 1 | 12.0% |
| | | KKat XK-618 | 0.2% |

Example 11

Part Density

Formula C3DM8-49 was extruded onto a rectangular mold using a 3M Scotch-Weld EPX Plus II Manual Applicator. The rectangular part cured at room temperature for 48 hours, and then was cured in an oven at 60° C. for 6 hours. A part was cut from the sample, was weighed for mass, and then volume was measured by displacement of water in a volumetric flask. Density was recorded as mass divided by volume. The density of the part was 1.12+/−0.01 g/mL.

Formula C3DM8-49 was printed using a Hyrel printer with a 2504, mixing volume tip with a 0.8 mm nozzle diameter. The printed part dimensions were a 50.8 mm×127 mm×3 layers. The line widths were set to 1.6 mm, and were printed with paths separated by 1.0 mm. The translation speed was 1000 mm/min and the flow multiplier was set to 3.0. The density of the part was 1.12+/−0.01 g/mL.

Example 12

Formula Variations to Achieve Changes in Part Hardness

The formulas in Table 20 were formulated to with a fixed number of ingredients to achieve a range of Shore A Hardnesses.

TABLE 20

| Formula Name | C3DM8-47 | C3DM8-36 | C3DM8-51 | C3DM8-41 | C3DM8-58 |
|---|---|---|---|---|---|
| Shore A Hardness | 36 | 37 | 50 | 64 | 90 |
| A:B Volumetric Ratio | 1:1 | 1:1 | 1:1 | 1:1 | 1:1 |
| A-side | Amount (wt %) | Amount (wt %) | Amount (wt %) | Amount (wt %) | Amount (wt %) |
| PL1010 MDI prepolymer | | 90.0 | | 80.0 | 65.0 |
| PL2010 MDI prepolymer | 80.0 | | 80.0 | | |
| Lupranate MI | 20.0 | 10.0 | 20.0 | 20.0 | 35.0 |
| B-side | | | | | |
| PL1010 polyol | 65.9 | 62.5 | 52.0 | 60.5 | 46.3 |
| PL2010 polyol | | 20.2 | 10.0 | | |
| Pluracol 1135i | 7.9 | | 10.0 | 9.9 | |
| Polyol Prepolymer 2 | 20.9 | 12.2 | 21.2 | 17.9 | 28.6 |
| Ethacure 100 | 3.0 | 5.0 | 5.0 | 4.5 | |
| Ethacure 300 | 2.0 | | 1.5 | 6.9 | 25 |
| Color | 0.2 | | 0.2 | 0.2 | |
| KKAT XK618 | 0.1 | 0.1 | 0.1 | 0.1 | 0.1 |

The complete disclosure of all patents, patent applications, and publications, and electronically available material cited herein are incorporated by reference in their entirety. Supplementary materials referenced in publications (such as supplementary tables, supplementary figures, supplementary materials and methods, and/or supplementary experimental data) are likewise incorporated by reference in their entirety. In the event that any inconsistency exists between the disclosure of the present application and the disclosure(s) of any document incorporated herein by reference, the disclosure of the present application shall govern. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present invention. At the very least, and not as an attempt to limit the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A method comprising:
providing a first reactive component and a second reactive component effective to form a thermoset product;
contacting the first reactive component with the second reactive component in a mixing chamber at a temperature and for a period of time sufficient to form a mixture comprising a partially cured thermoset product upon extrusion;
extruding the partially cured thermoset product out of the mixing chamber through an extrusion nozzle onto a substrate to form a layer; and
moving the extrusion nozzle and/or the substrate to form a 3D object
wherein the first reactive component comprises an isocyanate prepolymer having greater than 0.5% unreacted isocyanate groups and the second reactive component comprises a polyol prepolymer having greater than 1% unreacted alcohol groups, wherein the polyol prepolymer is the product of a reaction of (a) isocyanate with (b) an excess of (1) a polyol or (2) polyol and polyamine, wherein the polyol comprises lactone polyol and/or polycarbonate polyol.

2. The method of claim 1, wherein the isocyanate prepolymer is the product of a reaction of (a) (1) a polyol or (2) a polyol and a polyamine and (b) an excess of isocyanate, wherein the polyol comprises lactone polyol and/or polycarbonate polyol.

3. The method of claim 2, wherein the polyol comprises polycaprolactone polyol.

4. The method of claim 1, wherein the each of the first reactive component and the second reactive component have a Brookfield viscosity from about 500 cP to 500,000 cP.

5. The method of claim 1 wherein the partially cured thermoset product has a Brookfield viscosity below about 3,000,000 cP upon exiting the mixing chamber.

6. The method of claim 1, wherein a ratio of a viscosity of the first reactive component to a viscosity of the second reactive component is from about 1:3 to 3:1.

7. The method of claim 1, wherein the 3D object comprises an essentially solid thermoset product.

8. The method of claim 1, wherein the 3D object comprises a foamed thermoset product.

9. The method of claim 1 further comprising providing one or more additives comprising a catalyst and a chain extender.

10. The method of claim 1, wherein the layer spread decreases the height of the layer after curing by no greater than about 50% of the height of the layer when extruded.

11. The method of claim 1, wherein the layer spread decreases the height of the layer after curing by no greater than about 30% of the height of the layer when extruded.

12. The method of claim 1, wherein the layer spread decreases the height of the layer after curing by no greater than about 20% of the height of the layer when extruded.

13. The method of claim 1, wherein the layer spread decreases the height of the layer after curing by no greater than about 10% of the height of the layer when extruded.

14. The method of claim 1, wherein the layer spread decreases the height of the layer after curing by no greater than about 5% of the height of the layer when extruded.

15. The method of claim 1, wherein the extrusion nozzle has an inner diameter at the tip of about 0.01 mm to 2 mm.

16. The method according to claim 15, wherein the extrusion nozzle has an inner diameter at the tip of about 0.01 mm to 1 mm.

17. A method of creating a three dimensional (3D) object from reactive components that form a thermoset product using extruded thermoset printing, comprising:
providing a first reactive component and a second reactive component effective to form a thermoset product;
contacting the first reactive component with the second reactive component in a mixing chamber at a temperature and for a period of time sufficient to form a mixture comprising a partially cured thermoset product;
extruding the partially cured thermoset product out of the mixing chamber through an extrusion nozzle onto a substrate to form a layer; and
moving the extrusion nozzle and/or the substrate to form a 3D object,
wherein a ratio of a viscosity of the first reactive component to a viscosity of the second reactive component is from about 1:3 to 3:1.

18. The method of claim 17, wherein the each of the first reactive component and the second reactive component have a Brookfield viscosity from about 500 cP to 500,000 cP.

19. The method of claim 17 wherein the the first reactive component comprises an isocyanate prepolymer having greater than 0.5% unreacted isocyanate groups and the second reactive component comprises a polyol prepolymer having greater than 1% unreacted alcohol groups.

20. The method of claim 17 wherein the partially cured thermoset product is not thixotropic.

* * * * *